US00RE38870E

(19) United States
(12) Reissued Patent
Hall

(10) Patent Number: US RE38,870 E
(45) Date of Reissued Patent: Nov. 8, 2005

(54) COLLISION AVOIDANCE SYSTEM

(76) Inventor: Brett Osmund Hall, 4206 Lazy Creek Dr., Marietta, GA (US) 30066

(21) Appl. No.: 09/892,185

(22) Filed: Jun. 26, 2001

Related U.S. Patent Documents

Reissue of:
(64) Patent No.: 6,223,125
Issued: Apr. 24, 2001
Appl. No.: 09/478,485
Filed: Jan. 6, 2000

U.S. Applications:
(60) Provisional application No. 60/118,920, filed on Feb. 5, 1999.

(51) Int. Cl.[7] ..... G08G 1/00
(52) U.S. Cl. ..... 701/301; 701/117
(58) Field of Search ..... 701/301, 117, 701/118, 119; 340/928, 933, 936; 404/15

(56) References Cited

U.S. PATENT DOCUMENTS

| | | | | | |
|---|---|---|---|---|---|
| 1,497,073 | A | * | 6/1924 | Doyle | 49/360 |
| 1,531,987 | A | * | 3/1925 | Smith | 246/300 |
| 2,729,805 | A | * | 1/1956 | Struke | 340/901 |
| 3,389,677 | A | * | 6/1968 | Dunne | 116/205 |
| 4,012,156 | A | | 3/1977 | Turner | 404/15 |

(Continued)

FOREIGN PATENT DOCUMENTS

| | | | | |
|---|---|---|---|---|
| FR | 2647132 | | 11/1990 | |
| GB | 2079356 | | 1/1982 | |
| GB | 2233372 | A * | 1/1991 | E01F/09/04 |
| GB | 2333114 | A * | 7/1999 | |
| WO | 9419544 | | 9/1994 | |

*Primary Examiner*—Michael J. Zanelli
*Assistant Examiner*—Eric M. Gibson

(57) ABSTRACT

The Collision Avoidance System prevents collisions between vehicles and vehicular collisions with pedestrians, trains, and stationary objects by monitoring, controlling, documenting, and reporting the speed and position of vehicles. The system guards against speeding violations, moving violations, and particular safety hazards by invoking a reduction of vehicle speed or by restricting vehicle movement to control its position. This is primarily accomplished with the activation of a controllable road perturbation. The system also monitors pedestrians, school bus loading/unloading, traffic density, trains, environmental conditions that may affect driving, and traffic control systems to determine the action to take for collision prevention. The capability to monitor various parameters that may indicate an impending collision or detect parameters that indicate that conditions are more favorable for a collision allows the system to monitor an entire traffic environment to anticipate and thus prevent those collisions. The system integrates and synchronizes with existing traffic control devices and systems to ensure that it reinforces the traffic laws and safety intent of the environment in which it is installed. Sensors detect the status of objects within the traffic environment including the location and speed of vehicles. A computer is used to determine if the vehicles are adhering to the traffic laws or other safety concerns. Alarms may accompany the system output to inform the operator what must be done to prevent a collision. Additional sensors and cameras document the identity of violating vehicles as well as any resulting collisions and report the information to predetermined authorities through a multiple-channel communications interface. Authorities can remotely alter system operations to compensate for changes in traffic or weather conditions that demands a change in driving behavior in order to maintain safe travel. The system also allows emergency vehicles to pass unimpeded through the traffic environment.

32 Claims, 12 Drawing Sheets

U.S. PATENT DOCUMENTS 4,023,017 A * 5/1977 Ceseri ..... 701/118
4,692,764 A * 9/1987 Bonar ..... 342/175
4,775,865 A * 10/1988 Smith et al. ..... 340/906
5,041,828 A 8/1991 Loeven ..... 340/937
5,059,060 A * 10/1991 Steinhardt ..... 404/11
5,066,950 A 11/1991 Schweitzer ..... 340/937
5,267,808 A * 12/1993 Welford ..... 404/11
5,319,366 A * 6/1994 Mendeleev ..... 340/907
5,381,155 A * 1/1995 Gerber ..... 342/104
5,486,065 A 1/1996 James ..... 404/15
5,509,753 A 4/1996 Thompson ..... 404/6
5,574,469 A * 11/1996 Hsu ..... 342/357.08
5,617,086 A * 4/1997 Klashinsky et al. ..... 340/907
5,673,039 A * 9/1997 Pietzsch et al. ..... 340/905
5,742,699 A 4/1998 Adkins ..... 382/107
5,831,551 A 11/1998 Geduld ..... 340/905
5,948,038 A * 9/1999 Daly et al. ..... 701/117
5,952,941 A * 9/1999 Mardirossian ..... 340/936
6,026,347 A * 2/2000 Schuster ..... 701/301
6,035,053 A * 3/2000 Yoshioka et al. ..... 340/435

* cited by examiner

COLLISION AVOIDANCE SYSTEM

Matter enclosed in heavy brackets [ ] appears in the original patent but forms no part of this reissue specification; matter printed in italics indicates the additions made by reissue.

CROSS REFERENCE TO RELATED APPLICATION

This application claims the benefit of U.S. Provisional Patent Application Ser. No. 60/118,920 filed Feb. 5, 1999.

TECHNICAL FIELD

This invention relates to a system to prevent the involvement of vehicles in collisions with other vehicles, pedestrians, trains, and stationary objects.

BACKGROUND ART

Motor vehicles and the transportation they provide are significant contributors to the convenience and quality of our lives. However, the advantages of motor vehicle travel are offset by the collisions that result in deaths, injuries, property damage and the escalating costs of health care, automobile insurance rates, and court proceedings. The National Highway Traffic Safety Administration (NHTSA) says that deaths and injuries from motor vehicle collisions are the leading cause of death for persons of every age from 6 to 27 years old.

Efforts to increase seat belt usage and reduce drunk driving have reduced the number of deaths and injuries from collisions over the last 10 years. However, much remains to be done as evident by the following NHTSA statistics: In 1997, 41,967 people were killed (one death every 13 minutes) in the estimated 6,764,000 police-reported motor vehicle traffic collisions, 3,399,000 people were injured, and 4,542,000 collisions involved property damage only. In recent years, the economic cost alone of motor vehicle collisions was more than $150.5 billion in a single year.

Collisions are usually attributable to a vehicle's improper speed or position. The intent of traffic laws is to prevent collisions by coordinating the safe movement of vehicles and pedestrians. However, the effectiveness of traffic laws depends heavily on the operator's good conscious to obey the laws and the operator's good judgement in executing the laws. Although the visible presence of police seems to improve the operator's conscious and judgement, the availability of police at any time and location is limited. What is needed is a way to physically reinforce adherence to the traffic laws to prevent vehicle-related collisions, and do so at any hour of the day and virtually under any driving conditions. This invention provides that capability.

Inventions that address speeding and traffic monitoring are known in prior art. Inventions by Turner (U.S. Pat. No. 4,102,156), James (U.S. Pat. No. 5,486,065), Thompson (U.S. Pat. No. 5,509,753), Wilson (U.S. Pat. No. 2,079,356), and Davies (WO94/19544) all provide a mechanical apparatus to invoke a reduction of vehicle speed. Inventions by Loeven (U.S. Pat. No. 5,041,828), Schweitzer (U.S. Pat. No. 5,066,950), Adkins (U.S. Pat. No. 5,742,699), and Geduld (U.S. Pat. No. 5,831,551) relate to measuring vehicle speed or determining traffic statistics. However, the primary focus of the Collision Avoidance System is significantly different than prior art. This invention involves the operation of a system to prevent collisions. Conversely, most of the prior art focuses on either the design of a mechanical apparatus to invoke a reduction of vehicle speed, the design of a vehicle speed measuring system or a system to collect vehicle traffic statistics. Inventions by Loeven (U.S. Pat. No. 5,041,828) and Schweitzer (U.S. Pat. No. 5,066,950) detail traffic monitoring systems but provide no means to correct the violating actions that are detected. The invention by Charbonnier (U.S. Pat. No. 2,647,132) has a limited focus on the speed measurement of a single target vehicle and subsequent action towards only that vehicle. The Collision Avoidance Systems focuses on situations with collision potential and not only monitors a single target vehicle but other vehicles, pedestrians, emergency vehicles, and trains, as well as school bus loading/unloading, and traffic congestion. Such multifaceted monitoring and control facilitates the coordination of traffic movement for safer travel and exceeds the limitation of prior art in focusing only on a single target vehicle. For example, the present invention may monitor a vehicle or pedestrian but may direct its output response toward one or more other vehicles, thus demonstrating a sensitivity to the traffic environment and not just a single vehicle. After all, collisions always involve more than a single object. None of the prior art has the complete and immediate capability to prevent collisions to the extent delivered by the Collision Avoidance System.

The sophistication of the Collision Avoidance System not only monitors a vehicle's speed and employs speed-reduction but can do so in proportion to the excessive speed of the vehicle. This serves as a more effective alert to the operator than the limited, static responses presented by the prior art. A significant number of collisions are attributable to moving violations but prior art largely neglects this issue. Unlike the Collision Avoidance System, the design of the prior art does not allow police to adjust system response quickly and remotely to compensate for changes in road conditions that might make driving more hazardous, such as adverse weather or traffic congestion. The most valuable system to prevent collisions will integrate and synchronize with traditional traffic control devices and systems such as using the red, green, and yellow status of the traffic light signals as input to govern system response. This capability ensures that the Collision Avoidance System reinforces the traffic laws within the environment in which it is installed.

Most of the prior art is reactionary because a vehicle has to actually commit a speeding violation before the prior art system provides the intended function. This invention newly defines collision prevention by anticipating potential collisions. For example, pedestrians are protected in situations in which the sight of the pedestrian and the operator are restricted as they both proceed toward an intersection and a possible collision is forthcoming.

Real-time notification of collisions and the contributing violations are documented and transmitted directly to patrolling police and emergency medical personnel. This feedback is also not a part of the prior art. The most effective prevention of collisions must employ automatic and self-adjustment to the changing conditions within the monitored environment and do so 24 hours a day. None of the prior art provides this capability for many reasons including the fact that none of the prior art monitors the environment where a collision might occur. Thus the Collision Avoidance System allows efficient traffic, defined as the safest traffic at the fastest speed.

None of the prior art and patents, taken either singularly or in combination, is seen to describe the instant invention as claimed. Thus a system is desired to prevent vehicular collisions with other vehicles, pedestrians, trains, and stationary objects by monitoring, controlling, documenting, and reporting the vehicle's speed and position.

DISCLOSURE OF INVENTION

The National Highway Traffic Safety Administration defines speeding as not only exceeding the posted speed limit but also as driving too fast for conditions. Therefore, safe travel is situational because the conditions that increase the demand on vehicle operators to travel safely change frequently and are varied. For example, the conditions that require a change in the speed limit in order to maintain safe travel include: weather (rain, fog, snow, poor visibility), an existing collision, road construction, approaching an intersection, traffic congestion, approaching a blind curve or hill, approaching a school zone, and others.

Authorities know the locations that can quickly become hazardous under less than favorable conditions but do not have a rapid, flexible method to adjust the behavior of vehicle operators to ensure that safe travel is maintained when those conditions arise. Posted speed limits on highways and roads are rigid because there has not been a convenient way to temporarily adjust the speed limit, as situations may warrant, and subsequently enforce the new speed limit. This invention provides the police with the capability to remotely adjust the speed of traffic for various road conditions and situations to ensure efficient traffic, which is the safest traffic at the fastest speed.

The number of pedestrians hit by vehicles each year proves that traffic lights and signs are not sufficient to ensure pedestrian safety. Despite the posted speed limit or traffic lights, operator still frequently overlook these controls. The safety protection that is provided to children crossing the street in a school zone or at a school bus stop is virtually the same as it has always been. However, there are more vehicles on the road and more hurried and distracted motorists than ever before. Consequently, the number of vehicle-to-pedestrian collisions continues to climb. Furthermore, authorities are limited in their means to protect pedestrians from vehicles in an area where an operator has limited view such as blind corners or hills. Municipalities generally do not employ a physical control to protect pedestrians from wayward vehicles as they cross an intersection.

The Collision Avoidance System will provide such controls by employing a physical barrier that will not only reduce a vehicle's speed as it approaches a pedestrian crossing but also provide a measure of pedestrian protection from wayward vehicles. The Collision Avoidance System takes pedestrian safety to a new level while ensuring more effective compliance to traffic regulations.

It is a frequent and controversial occurrence for the police and the operator to harshly disagree regarding an alleged traffic violation. Even as the two parties go through the court process it is still the word of one against the other. Many motorists (especially if from a different locale) doubt they will get a fair evaluation by the local judge because they sometimes believe the municipality set up a "speed trap" to generate revenue. Many motorists are so disenchanted with the process that they just concede to pay the fine and never go to court.

The Collision Avoidance System provides an independent and unbiased interpretation of traffic events within the monitored environment. The police will not have access to the inner workings of the Collision Avoidance System or the interpretation of a traffic violation by the system. Therefore, the police can not be justifiably accused of entrapment when acting on a reported violation. The system will only capture actual infringements and provide the supporting documentation. Therefore, accused motorists can confidently request to see verification of an alleged violation from the Collision Avoidance System. Thus the system will serve as a third-party witness to alleged violations and prove or disprove disputing claims.

Typical speed detection is the manual operation of radar and laser devices by police. The way these devices are used is inherently inefficient and limits the effort to prevent highway collisions. Consider a police officer's attempt to monitor a group of speeding vehicles traveling in close proximity. The police officer is limited because: 1) He can only monitor a single vehicle with a single speed detector, 2) The nearest vehicles will block his view and ability to measure the speed of suspect vehicles in the far-side lanes, 3) He is challenged to measure the speed and document the identity and license of each vehicle in the group before they all pass, 4) He has limited ability to slow down all of the vehicles.

The Collision Avoidance System will provide more accurate and widespread monitoring than a police officer with a single, manually operated speed detection device. The system will independently monitor each lane of traffic with speed detection devices that have a direct line-of-sight to approaching vehicles. Each speeding vehicle is documented and independently invokes the Collision Avoidance System to slow the speeding vehicle with a proportional and adjustable road perturbation.

At issue is how to extend the presence of traffic law enforcement in the absence of patrolling police officers. Overwhelmingly, automotive collisions occur because an operator exercises poor judgement, is not attentive, or blatantly disobeys the traffic laws. Consequently, the operator will operate the vehicle at an improper speed or place the vehicle in an improper location. The intent of traffic laws is to prevent collisions by coordinating the safe movement of vehicles and pedestrians. However, the effectiveness of traffic laws depends heavily on the operator's good conscious to obey the laws and the operator's good judgement in driving according to the laws. Although the presence of police seems to improve the operator's conscious and judgement, the availability of police at any time and location is limited.

Municipalities can not dedicate police solely to the full time duty of monitoring compliance to traffic laws. The Collision Avoidance System can monitor and exert control on traffic 24 hours a day because the system does not require manual operation. With The Collision Avoidance System police do not have to be present to enforce traffic laws. Controlling the system through its communications link will extend the presence and capability of police. Imagine authorities with the capability to remotely alter the speed limit and enforce it faster than a change in the weather makes a sharp curve dangerous.

The remote control of the Collision Avoidance System's operation is just the first part of extending the presence of traffic law enforcement. The second part is the feedback that the Collision Avoidance System delivers from the monitored environment. The prevention of collisions is really a two step process composed of reinforcement and enforcement. The Collision Avoidance System provides reinforcement of the traffic laws through the monitoring and physical impedance of violating vehicles. The police provide enforcement of the traffic laws by issuing warnings and tickets with the intention of altering a negative driving behavior. The Collision Avoidance System's monitoring, reporting, and communication features will enhance the ability of the police to enforce the traffic laws through the real-time transmission of traffic violations to police officers at headquarters and on patrol. Thus patrolling officers will be informed of traffic violations even though they were not present when the incident occurred.

The current limitations of documenting traffic violations have not contributed to a significant reduction of collisions, The use of videotape is a challenge because of issues concerning tape storage, loading and unloading tape, and hours of accumulated tape that is recorded just in case a violation occurred. Obviously this approach depends heavily of human intervention.

The Collision Avoidance System monitors vehicles for traffic violations and can employ a digital camera to document the incident and any resulting collision. Photographs are taken only when there is a relevant event and the digital technology requires no tape or film and supports the rapid, electronic transmission of the photographs. The Collision Avoidance System will capture and automatically transmit to authorities information revealing a vehicle's make, model, color, license tag and include the date, time, and the traffic violation description. This documentation will help authorities assess liability for collisions by serving as an "eye witness" to the occurring incident. All documentation can be saved on a computer for later use in court or submitted to the vehicle owner or an insurance company via facsimile or e-mail.

BRIEF DESCRIPTION OF DRAWINGS

Similar reference characters denote corresponding features consistently throughout the attached drawings.

BEST MODE FOR CARRYING OUT THE INVENTION

This invention is the Collision Avoidance System. It prevents collisions between vehicles as well as vehicular collisions with pedestrians, trains, and stationary objects by monitoring, controlling, documenting, and reporting the vehicle's speed and position. Additionally, the system can monitor pedestrians, traffic density, trains, road moisture, and traffic control systems to determine the action to take for collision prevention. This invention is applicable to virtually any situation demanding the prevention of automotive related collisions.

The primary output response of the Collision Avoidance System is the presentation of a safe road perturbation to a vehicle, in accordance to the operator's adherence to the traffic laws or other safety concerns. Such a tactile feedback serves to both remind the operator of the traffic laws as well as to restrain him from doing otherwise. The result is a reduction in the number and severity of collisions.

A traditional and rudimentary way to reduce vehicle speed is with a speed breaker to force motorists to slow down. However, a speed breaker is not practical is many situations because it is static and can not be adjusted for varying conditions. Before examining how the Collision Avoidance System will prevent collisions for those varying conditions, consider the description and function of the system components in FIG. 1.

Figure 1:
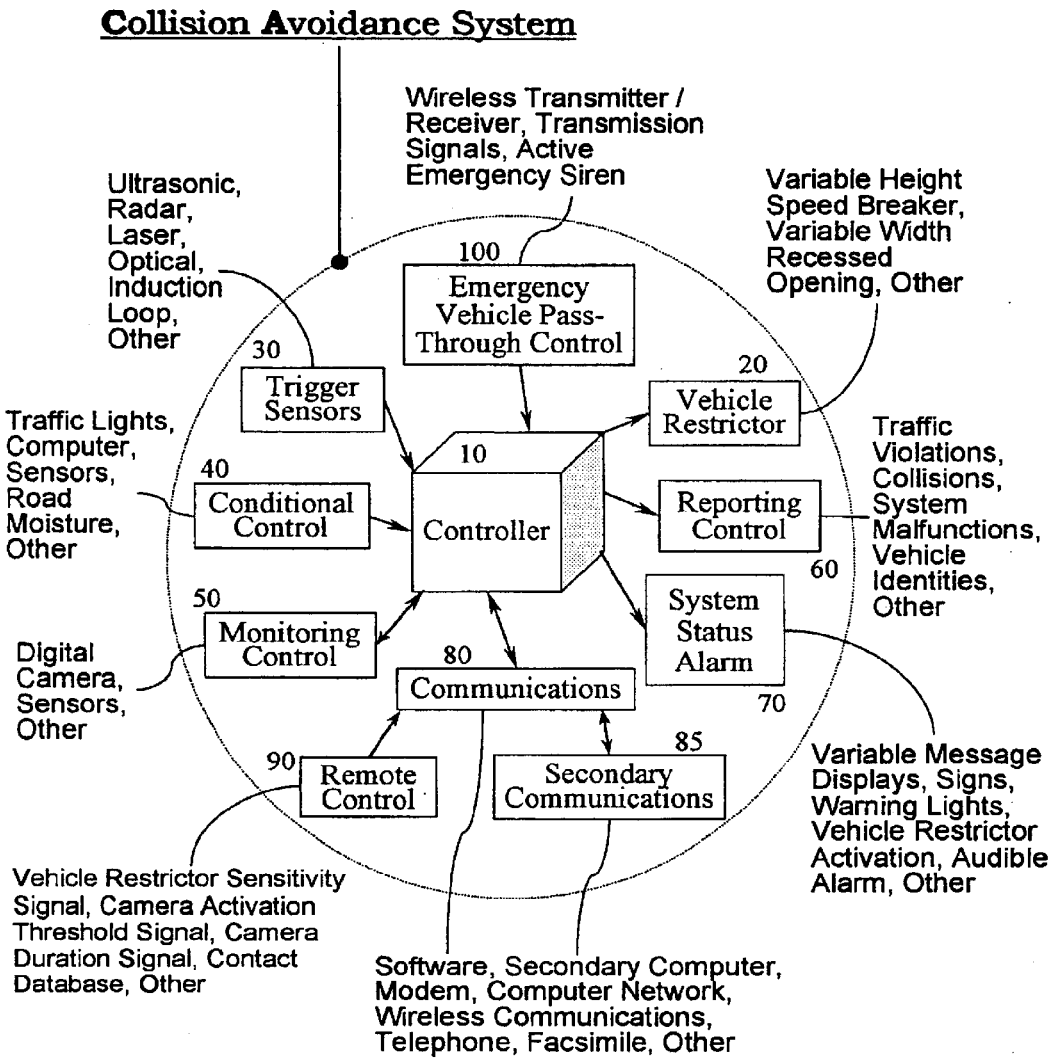
FIG. 1 is a depiction of the Collision Avoidance System concept, system components, the flow of information between the system controller and the components, and examples of each component.

FIG. 1—Collision Avoidan[e]ce System Components

The Controller 10 hardware is an industrial grad computer having a conventional microprocessor and computer readable memory that is used to provide control for the Collision Avoidance System based upon input from sensors and operational settings. The Controller 10 then executes the control logic to activate the appropriate outputs. The control logic (programming code) will be in accordance with the traffic laws for the situation in which the Collision Avoidance System is used. It is to be understood that the Controller 10 includes the programming code throughout the description of the invention. The industrial design of the computer is needed to seal the computer from the environment since it will likely be located at the site of the monitored environment. Numerous vendors provide industrial computers as well as the integrating input modules to allow the interpretation of sensor data. Vendors also provide output modules that integrate into the Controller 10 to control external components such as switches, hydraulic valves, motors, and other actuating components.

The Trigger Sensors 30 invoke the Collision Avoidance System response. The sensors monitor certain parameters that are possible indicators of an impending collision. Those parameters primarily include the presence, position, direction, and speed of a vehicle, pedestrian or train. Additional sensors monitor parameters that indicate the environmental conditions that make the potential for collisions more likely such as road moisture and reduced visibility. The trigger sensors 30 sense at least one of such parameters and thus trigger the system by providing the appropriate signal to the Controller 10, which subsequently activates one or more Vehicle Restrictors 20. In some situations, the Conditional Control 40 will provide the closing contingency to actually execute the Vehicle Restrictors 20 and other outputs.

The type of sensors used for triggering will depend on the object that is to be monitored for collision prevention within the area in which the system is installed. Some typical sensors will be speed detection (radar, laser), induction loop, ultrasonic, optical, wireless transmitter/receiver, switch closure, and precipitation (moisture) detectors. Basically any reasonable means of detecting the mentioned parameters and converting that detection into the appropriate electrical signals will suffice as a trigger sensor. Any number or type of sensors may be used in an implementation to achieve the intended purpose. This also applies to the sensors used for the Conditional Control 40 and Monitoring Control 50.

The Conditional Control 40 is a signal from a sensor or traffic command source that alters (cancels or completes) the preliminary Collision Avoidance System response that was typically initiated by the Trigger Sensor 30. Occasionally, the alteration will be a change in the degree of system response as described in FIG. 11. A signal from the Conditional Control 40 will typically be the result of detecting the parameter(s) of a different target object than that detected by the Trigger Sensor 30. The sensors used for Conditional Control are of the same technology as described for the Trigger Sensors. A signal from a traffic command source (such as traffic lights, caution lights, and safety gates) integrates and synchronizes the Collision Avoidance System to the standard safety systems that the Collision Avoidance System is supporting.

The Monitoring Control Device 50 is provided by devices, and the capture of data from those devices, that indicates a violation of the Collision Avoidance System intent. Examples of monitoring devices are cameras and sensors that monitor a vehicle's presence, position, direction or speed. The sensors detect a vehicle when the operator does not adhere to the traffic laws and the activation of the camera subsequently documents the violating vehicle. The cameras are positioned to capture the image of the vehicle's manufacturer, model, color, license tag, and physical position within the environment.

The Reporting Control 60 conveys to designated authorities reportable events such as violations of the Collision Avoidance System intent, deactivation of the Vehicle Restrictors 20 by the Emergency Vehicle Pass-Through Control 100, malfunctions of either the Collision Avoidance System or the existing traffic system being supported. The Reporting Control 60 will take information provided by the Monitoring Control 50 and integrate the date, time, and location of the reportable event. The Reporting Control 60 will also contain a database of designated authorities and their contact information such as telephone numbers, pager numbers, and e-mail addresses, as well as which person should be contacted for a particular reportable incident. This will facilitate the transmission of the appropriate reportable event to the police, emergency medical personnel, maintenance, school officials, railroad officials or other designated authorities.

Some installations may require the Collision Avoidance System to monitor and control against multiple types of violations. An example is an intersection in which the violations that could cause a collision are running a red light, speeding, and failure to yield at a pedestrian crossing. Different sensors of the Monitoring Control 50 may be used to detect the different violations and the Reporting Control 60 will provide the corresponding description and violation code.

The information configured by the Reporting Control 60 is transmitted to the Secondary Computer that is a part of the Secondary Communications 85. The Secondary Computer will likely be located in a police headquarters as shown in FIGS. 2 through 12. However, if the system is implemented on private property then the local authorities may have access to the Secondary Computer. The private property owners can still ensure that the police retrieve relevant information of reportable incidents by including the appropriate information in the contact database of the Reporting Control 60. The reported information can be stored for indefinite retrieval, printed, faxed, or e-mailed for submission to the Department of Motor Vehicles, traffic court officials, an insurance company, or the registered vehicle owner.

The typical components of the Communications 80 include communications software and hardware, wireless receiver/transmitter, and modem or computer network connections. These components are used to receive control commands from or transmit data to a remote computing means such as the Secondary Computer that is part of the Secondary Communications 85. The Communications 80 is connected to the Controller 10 and located at the site of system installation.

The Secondary Computer will typically be located in police headquarters will include software that allows control commands to be sent to the Controller 10 and support bi-directional transmissions with the Communications 80. The police at headquarters will have the option to relay reportable incidents that occur in the Collision Avoidance System environment to police vehicles on patrol. This transmission will be accomplished using the Secondary Communications 85. An increasing number of police vehicles are equipped with mobile computers. Some of the computers are hardwired into the vehicle while others are environmentally hardened laptops. These systems are configured to provide patrolling officers with access to police computer records such as suspect descriptions and stolen vehicles. The Secondary Communications 85 includes the necessary hardware and software to support the transmissions from the Secondary Computer in the police headquarters to the mobile computers in the police vehicles. The data indicating the reported incidents may appear in text or graphical formats. The graphical format is preferred because the photographs of the violating vehicle, taken by the Monitoring Control 50, will be conveyed to the patrolling police officers. To be effective and efficient, the entire process will occur in real-time and independent of human intervention. Thus the Collision Avoidance System will work in an integrated fashion with traffic law enforcement to provide a new capability in the prevention of collisions.

As a part of the Secondary Communications 85, the Secondary Computer 86 shown in FIGS. 2 through 12 can also be configured to automatically forward (e-mail, fax, telephone call with pre-recorded message) reportable events to predetermined emergency medical personnel. The hospitals nearest the location where the Collision Avoidance System is installed will be determined and the associated contact information entered into the Secondary Computer in advance. Obviously every reported incident will not demand emergency medical services. The value of the photographs taken by the Monitoring Control 50 at the time of the violation and several seconds thereafter will reveal the severity of any collision. Ambulance officials will determine whether to respond immediately by interpreting the photographs. Typically emergency medical personnel are not called until after the Emergency 911 service is informed of the collision by a bystander or after the police arrive on the scene. The said feature gives emergency medical personnel a significantly greater lead-time and allows them to respond much faster. The improved response time will make the difference in the number of lives that are saved.

Optical Character Recognition (OCR) and License Plate Recognition (LPR) technologies transform a photograph of a license plate into computer-recognizable text. Several vendors provide software to perform this function. Linking these technologies with the Collision Avoidance System and the Department of Motor Vehicle will provide transportation and traffic authorities with a new level of automatic access. The OCR/LPR software will reside on the Secondary Computer 86 of the Secondary Communications 85 shown in FIGS. 2 through 12. When an incident in reported the captured license plate will be converted to computer-recognizable text and the license plate number (and state identification) will be sent to the Department of Motor Vehicles to determine the owners of the vehicles. The configuration of the DMV computer will allow it to identify an owner by cross-referencing the license tag number in the appropriate database and return that information to the Secondary Computer. The Secondary Computer will then relay the information to the mobile computer accompanying the patrolling police officers. With this capability, police could known the owners of the vehicles involved in the collision before they arrive on the scene. If the owner of the vehicle was not at the scene of a traffic violation or collision then this capability will also facilitate owner notification. This capability will also assist the police in identifying vehicles that are involved in hit-and-run occurrences.

The System Status Alarm 70 provides sensory (visual, auditory, tactile) feedback that indicates the status or set point condition of the Collision Avoidance System to those affected by the system's operation in order to prevent an impending collision. Examples include updating the message of electronic displays or illuminating informational lights and even the vehicle restrictor itself since it provides visual and tactile feedback upon activation. Although the alarm is predominately directed toward the operator of a vehicle, an alarm may occasionally be directed toward a pedestrian to alert him to the presence of a vehicle.

The Vehicle Restrictor 20 is a mechanically actuated device capable of providing impedance to the speed and position of a vehicle. The operation of the restrictor may vary from fully deployed to inactive. One design of the restrictor might be cylindrical-shaped, resembling a static speed bump but with the capability to vary the height. The height variance is accomplished by extending the cylinder from a recessed area in the road and varying the radius of the cylinder that is above the road surface. Another design might resemble a recessed area across a lane, with a retractable door that varies the width of the recessed area. However, a vehicle restrictor is only one component of the Collision Avoidance System and its design is not the focus of this invention. Any commercially proven device that can safely and reliably provide a controllable and variable road perturbation to impede a vehicle will likely suffice as a vehicle restrictor. The best mode of operation will likely be hydraulically driven because of the magnitude of force required to withstand the weight of passing vehicles. A servo actuated hydraulic value can receive a signal from the Controller 10 that corresponds to the desired deployment height of the Vehicle Restrictor 20.

The configuration (shape and deployable height) of the Vehicle Restrictor 20 will depend on the implementation. For example, in a highway implementation safety will demand that the maximum height be moderate because of the higher vehicle speeds. However, a Vehicle Restrictor 20 intended to provide pedestrian protection at a crosswalk would have a greater deployment height. Slower vehicle speeds than the highway implementation would still allow the greater deployable height to be safe. The number of restrictors in an implementation may also vary depending on the amount of lead-time the operator should have in order to reduce speed or come to a complete stop.

The Remote Control 90 allows authorities to remotely adjust the Collision Avoidance System's operational parameters from the Secondary Computer. The first type of adjustable operational parameters is for system hardware and system output responses. For example, authorities can set the threshold of the Trigger Sensors 30 required to invoke a system response, set the degree of activation response for Vehicle Restrictors 20, set the threshold and duration of camera response, or change the System Status Alarm 70 message for visual displays. The second type of operational parameter is the update of the contact database (names, telephone numbers, e-mail addresses, pager numbers) of persons or organizations to contact for various types of reportable incidents. The contact database information serves as the reference for the Reporting Control 60 as described later. Threshold parameters (other than component hardware) are the third type of operational parameter that is remotely adjustable through the Remote Control 90. These parameters are unique to a particular implementation and they are the levels that a monitored object has to reach before a certain system response is invoked or changed. Setting the baseline speed limit within the monitored environment is one example. The explanations of FIGS. 9 and 11 will provide other examples.

Access to the Remote Control 90 from the Secondary Computer will be password protected to allow only designated persons to change the operational parameters. The Remote Control 90 also provides automatic system changes according to a predetermined schedule. Operational parameters can be scheduled for automatic changes on a periodic basis (such as hourly, daily, weekly) or in anticipation of an upcoming event (such as a sporting event or business convention) that will place a greater or lesser demand on traffic safety.

The Emergency Vehicle Pass-Through Control 100 allows emergency vehicles (ambulances, fire trucks, and police vehicles) to notify the Collision Avoidance System in advance of the vehicle's arrival so that the Controller 10 will deactivate the Vehicle Restrictors 20 and provide unimpeded passing. Communications between the emergency vehicle and the Controller 10 is accomplished through wireless transmissions. The explanation of FIG. 12 will clarify.

The most appealing aspect of the Collision Avoidance System is adaptability to many situations. This is accomplished by the configuration of system components for specific traffic and safety concerns and the capability to alter system responses to changes in the traffic environment. Although examples of the system's adaptability are illustrated in FIGS. 2 through 12, the system is not limited to the described uses. Also, some features may be presented in some figures but not in others. The absence of any feature is based on the depicted situational need and not on the capability of the Collision Avoidance System.

Figure 2:
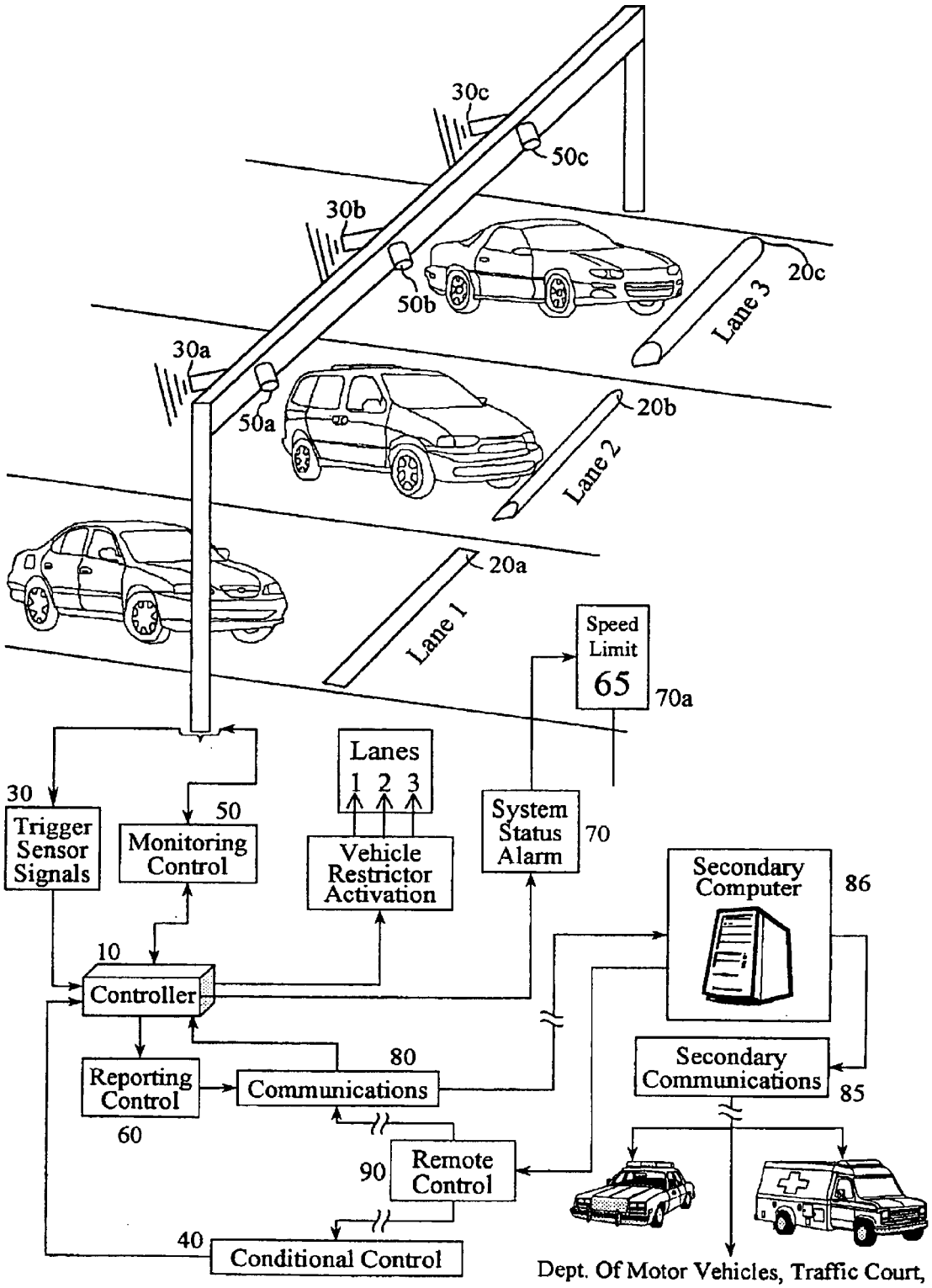
FIG. 2 is a view of the Collision Avoidance System preventing collisions by controlling vehicle speed on an interstate highway.

FIG. 2—Highway Speeding

The economic cost for speeding-related collisions is estimated by NHTSA to be $28.9 billion per year. In 1997, speeding was a contributing factor in 30% of all fatal collisions, and 13,036 lives were lost in speeding-related collisions. Nearly three quarters of a million people suffered injuries from speeding collisions in 1997. FIG. 2 depicts the Collision Avoidance System preventing collisions by controlling highway speeding. The Trigger Sensors 30a, 30b, 30c in FIG. 2 are speed detection sensors such as the radar or laser devices used by the police. (The capability of the system is not dependent on the method of speed detection. For example, another configuration would be to measure the amount of time it takes a vehicle to pass between two vehicle detection sensors that are separated by a known distance as in FIG. 11.) The output of the speed sensors 30a, 30b, 30c are the input (Trigger Sensor Signals 30) for the Controller 10. The Vehicle Restrictors 20a, 20b, 20c extend across a traffic lane and their height above the road surface can be varied from zero to some maximum height. The speed limit issued by the police provides the Conditional Control 40.

The idea in FIG. 2 is to measure the speed of each vehicle in a lane of traffic and independently adjust the height of each Vehicle Restrictor 20a, 20b, 20c relative to the degree of excessive speed. The Trigger Sensor 30a for Lane 1 detects that the vehicle is at or below the posted speed limit. Therefore, the Vehicle Restrictor 20a in Lane 1 is not deployed and the operator will feel no perturbation as an indication to slow down. The vehicles in Lane 2 and Lane 3 are above the speed limit. The deployed height of the Vehicle Restrictor 20c in Lane 3 is greater than the height of the Vehicle Restrictor 20b in Lane 2 since the corresponding vehicle exceeds the speed limit by a greater amount. Consequently, the Collision Avoidance System can provide each operator with feedback to slow down in proportion to the excessive speed of the vehicle. Although the vehicle speeds triggers the system, it is the comparisons of those speeds to the speed limit (Conditional Control 40) that determines the activation of a particular Vehicle Restrictor 20a, 20b, 20c.

One of the Remote Control 90 features of the Collision Avoidance System is adjustment of the Vehicle Restrictor sensitivity. Authorized operators can change the sensitivity through the Communications 80 interface by issuing the appropriate commands to the Controller 10. One sensitivity setting might raise a Vehicle Restrictor three inches for 10 mph over the speed limit but a different setting produces six-inch activation for the same speed. The capability to alter system response through the sensitivity setting provides authorities with the flexibility to adjust the speed of traffic for varying road conditions and situations, thus ensuring safer travel.

Another major component in the prevention of speed-related collisions is the notification to operator of the speed limit. The System Status Alarm 70 in this example includes electronic speed limit displays 70a in advance of and within the Collision Avoidance System environment. The command to change the speed limit is issued by authorities using the Remote Control 90 through the Communications 80 interface. The Controller 10 adjusts the operation of the entire Collision Avoidance System accordingly by updating the speed limit display for the motorists and then deploying the Vehicle Restrictors 20a, 20b, 20c based on the new speed limit.

Monitoring Control 50 digital cameras 50a, 50b, 50c in FIG. 2 capture violations by using the speed sensors (Trigger Sensors 30a, 30b, 30c) as the monitoring devices. Using the Remote Control 90 through the Communications 80 interface, authorities can set the threshold of camera activation, relative to the posted speed limit. For example, the camera threshold can be set to capture a speeding vehicle when it exceeds the speed limit by 10 miles per hour or not activate until the vehicle speed exceeds the speed limit by 20 miles per hour. The digital camera photographs will capture the vehicle's identities, including the manufacturer, model, color, and license tag. The digital photographs, posted speed limit, actual vehicle speed, location, date, and time are formatted and transmitted to the authorities by the Reporting Control 60. As previously described the Secondary Communications 85 an Secondary Computer 86 will relay reportable incidents to patrolling police officers, emergency medical personnel, and other predetermined agencies or persons.

Figure 3:
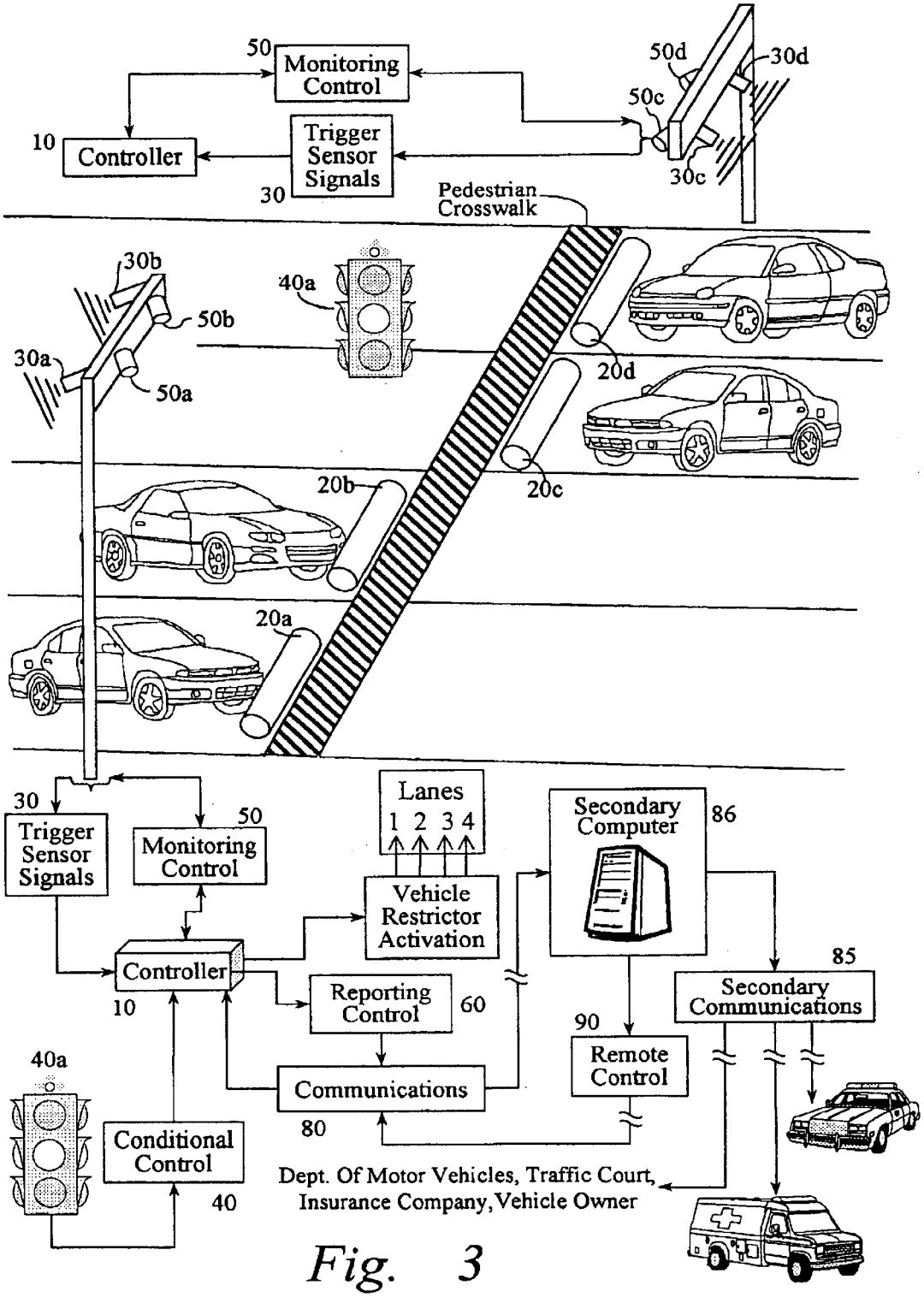
FIG. 3 shows the Collision Avoidance System preventing collisions by controlling vehicle speed and providing pedestrian protection on a city street.

FIG. 3—Vehicle & Pedestrian Intersections

The National Highway Traffic Safety Administration quotes the following statistics regarding vehicle-to-pedestrian collisions. In 1997, 77,000 pedestrians were injured and 5,307 were killed in traffic collisions in the United States, representing two percent of all the people injured to traffic collisions and 13% of all traffic fatalities. On average, a pedestrian is killed in a motor vehicle collision every 99 minutes, and one is injured every seven minutes. Nearly one-third of all children between the ages of five and nine who were killed in motor vehicle traffic collisions were pedestrians. One-fifth of the traffic fatalities under age 16 were pedestrians.

FIG. 3 depicts the Collision Avoidance System preventing vehicle-to-pedestrian collisions on a city street with a pedestrian crosswalk. The functions of the components are as previously described. The Trigger Sensors 30a–30d are radar or laser devices that are used for speed detection and provide Trigger Sensor Signals 30 input to the Controller 10. For this implementation, the Vehicle Restrictors 20a–20d must provide pedestrian protection as well as vehicle speed control. Therefore, the deployable height of the restrictors is greater than in FIG. 2. The Remote Control 90 is as described for FIG. 2, for the alteration of Vehicle Restrictor output sensitivity and camera activation threshold.

The Insurance Institute for Highway Safety provides the following statistics regarding the failure to yield to traffic lights and signals: Disregarding red lights and other traffic control devices are the leading cause of urban collisions representing 22% of the total number of collisions. Drivers who run red lights are responsible for an estimated 260,000 collisions each year and at least 750 of those collisions result in fatalities. On a national basis, fatal motor vehicle collisions at traffic signals increased 19% between 1992 and 1996, representing a six-percent increase over all other causes of fatal collisions.

Conditional Control 40 in FIG. 3 is provided by the traffic light 40a. The traffic light signals (red, yellow, and green) integrate and synchronize the Collision Avoidance System to the traffic laws and safety intent of the intersection. When the cycle of the traffic light 40a first displays yellow, the system starts to deploy the Vehicle Restrictors 20a–20d. If the Trigger Sensors 30a–30d detect that a vehicle is actually increasing in speed, due to an operator attempting to beat the impending red light, the Controller 10 responds by activating the Vehicle Restrictors 20a–20d more aggressively. The purpose of this action is to reinforce the true meaning of the yellow light, which is to slow down and prepare to stop. The intent is to avoid a collision and protect pedestrians by ensuring a safer pedestrian crossing since the impending red light is timed with an indication for pedestrians to cross. The passing of a vehicle through the intersection during a yellow light will not necessarily invoke the Monitoring Control's 50 cameras 50a–50d to photograph the vehicle. However, if the operator increases vehicle speed to beat the light or does not slow down sufficiently as the vehicle approaches the intersection, then a photograph of the vehicle's identities (manufacturer, model, color, and license tag) will be taken. The Reporting Control 60 will time-stamp and format the photograph, include the necessary violation information, and invoke the Communications 80 interface to transmit a report of the violation to authorities.

By the time the traffic light 40a (providing Conditional Control 40) displays the red light the Vehicle Restrictors 20a–20d are fully deployed. To prevent an operator from prematurely moving into the intersection in anticipation of the green light, the Vehicle Restrictors 20a–20d will remain deployed until the green light is displayed. As part of the Monitoring Control 50, additional vehicle detection sensors may be used to determine if the vehicles move into the intersection while pedestrians still have the right-of-way. If an operator runs a red light, the Monitoring Control's 50 cameras 50a–50d will photograph the vehicle's identities. The Reporting Control 60 will time-stamp and format the photograph, include the necessary violation information, and invoke the Communications 80 interface to transmit a report of the violation to authorities via the computer 86 that is a part of the Secondary Communications 85.

When the traffic light 40a (providing Conditional Control 40) displays the green light, the Collision Avoidance System initially deactivates the Vehicle Restrictors 20a–20d to let the stopped vehicles proceed unimpeded. Thereafter, throughout the duration of the green light, the Collision Avoidance System independently monitors and controls each vehicle in proportion to that vehicle's excessive vehicle speed, as an indication to the operator to slow down, as described for FIG. 2.

In the event of a traffic light 40a malfunction the Collision Avoidance System can be programmed to either totally deactivate all Vehicle Restrictors 20a–20d or disregard the Conditional Control 40 from the traffic light 40a and use an internal timer based on the same time sequence of the traffic light. Thus the system can continue to control the speed and position of vehicles and coordinate vehicle and pedestrian traffic during a malfunctioning traffic light. A malfunction of the traffic light 40a is a reportable incident that the Reporting Control 60 will transmit to authorities. Even this feature seeks to prevent collisions through the rapid notification of the malfunction.

Issues regarding human suffering, insurance, healthcare, and their monetary costs can not be avoided when collisions have occurred. Court time and costs associated with determining legal liability are also very significant. Therefore, the Monitoring Control 50 and Reporting Control 60 are tremendously valuable in documenting the events that led to the collision as well as documenting the actual collision. As previously described, vehicle actions that are inconsistent with the intent of the traffic light 40a or the speed limit are captured and reported. Additionally, through the Remote Control 90, authorities can program the Monitoring Control 50 to take photographs repeatedly for a predetermined number of seconds after a violation. Thus if the violating incident leads to a collision then the collision will also be photographed and subsequently transmitted to the authorities. Examples of the violations that the Monitoring Control 50 detects and activates the cameras to capture include: running a red light, excessive speed (threshold defined by authorities), increasing speed during a yellow light, failure to sufficiently decrease speed during a yellow light, and failure to yield to a pedestrian right-of-way before turning. As previously described the Secondary Communications 85 and Secondary Computer 86 will relay reportable incidents to patrolling police officers, emergency medical personnel, and other predetermined agencies or persons.

Although it is not shown in FIG. 3, the electronic speed limit display shown in FIG. 2 could also be a part of this implementation as a System Status Alarm if authorities want to alter the speed limit. The command to change the system speed limit is issued with the Remote Control 90.

Figure 4:
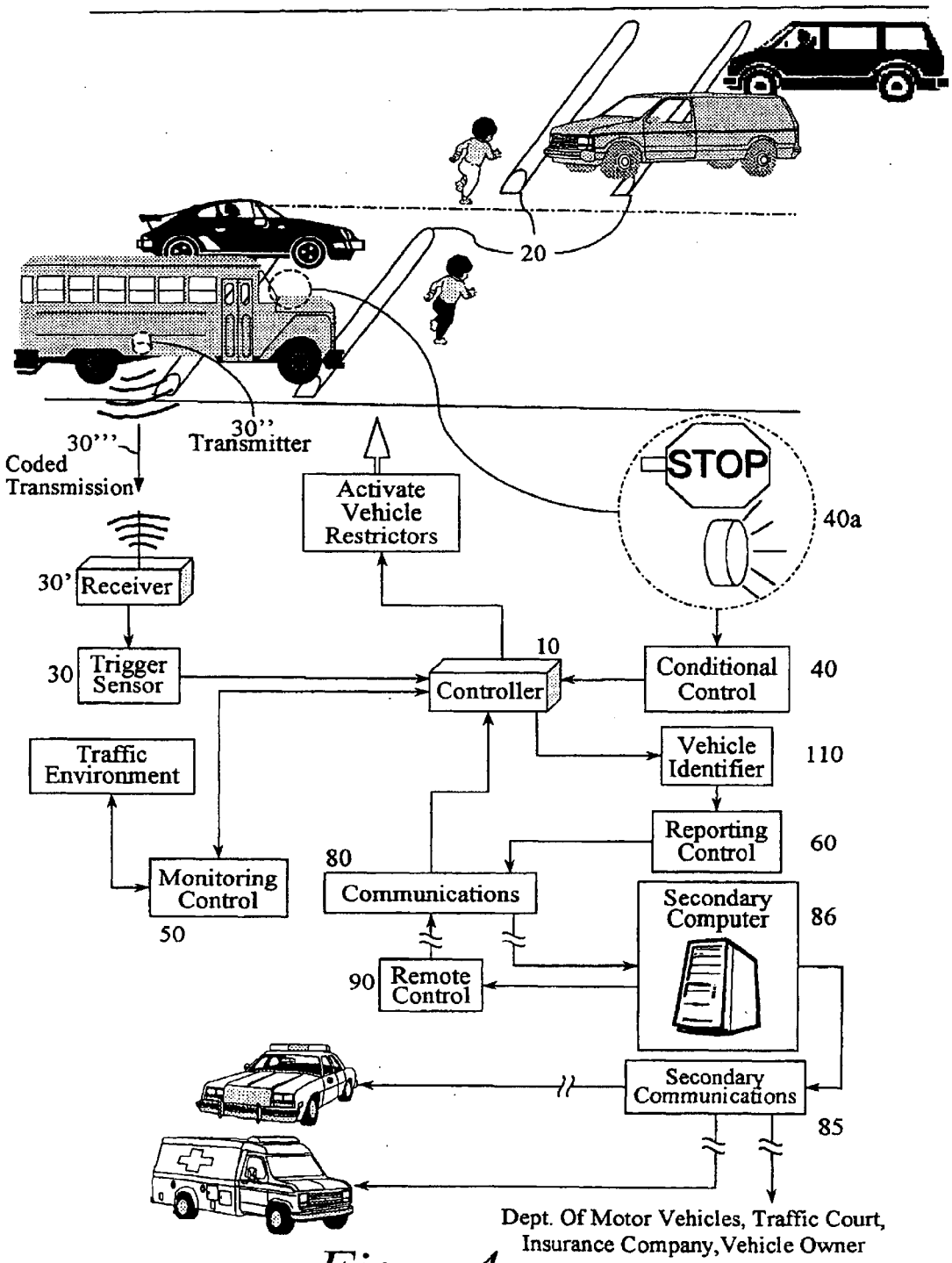
FIG. 4 is an illustration of the Collision Avoidance System preventing vehicle-to-pedestrian collisions by protecting children as they leave a school bus.

FIG. 4—School Bus Loading & Unloading

According to the National Center for Statistics and Analysis, from 1988 to 1998, 73% of the school-age children that died in school bus-related traffic collisions were pedestrian and 50% of those children were between five to seven years old. Laws demand that motorists stop as school buses load and unload children. Despite such laws, children are still killed or injured by motorists in vehicles that failed to stop in time. In many cases, the operator claimed to have never noticed the children in transition to or from the bus. The Collision Avoidance System can not only provide motorists with improved notification but also provide more aggressive child protection, in addition to reinforcing the law to stop.

FIG. 4 shows the prevention of vehicle-to-pedestrian collisions at a school bus stop. A school bus is equipped with a concealed Transmitter 30" matched to the frequency of a Receiver 30' that provides input into the Controller 10. The Transmitter/Receiver pair serves as the Trigger Sensor 30. Since school buses often pass a bus stop without stopping, it is essential that the Vehicle Restrictors 20 only be activated during actual loading and unloading. For example, the bus will have no children before the first pick up or after the last drop off. Other school buses will pass certain stops because those stops are along major thoroughfares but not part of their predetermined pick up locations. In order to prevent false activation of the Vehicle Restrictors 20, Conditional Control 40 is provided by the actual loading/unloading operation of the bus as indicated by the deployment of the STOP sign on the side of the bus and the flashing caution lights 40a. This is the conditional action will enable the bus Transmitter 30" to communicate to the Receiver 30', thus triggering the Controller 10. At that juncture the Controller 10 will activate Vehicle Restrictors 20 in all lanes. Several Vehicle Restrictors 20 can be placed in a given lane with the degree of restrictor deployment being more aggressive as the vehicle approaches the crossing zone. Thus the Collision Avoidance System will not only alert the operator to slow down but also provide a measure of physical protection for the children. The Vehicle Restrictors 20 will be deactivated when the bus driver terminates the loading/unloading operation by retracting the STOP sign and turning off the bus caution lights 40a.

To prevent false activation by signals from a source other than a school bus, the signals from the bus Transmitter 30" will be a Coded Transmission 30'", and include a unique identifier of the specific bus activating the Collision Avoidance System. Vehicle movement over the pedestrian crossing during loading/unloading is a reportable incident and invokes the Monitoring Control 50 to photograph the vehicle. The photographs and the vehicle identifier 110 of the bus will be transmitted by the Reporting Control 60 to authorities through the Communications 80. Since this implementation involves school children, the Reporting Control 60 will also include the names and contact information for the appropriate school officials so that they will be notified of the incident. As previously described the Secondary Communications 85 and Secondary Computer 86 will relay reportable incidents to patrolling police officers, emergency medical personnel, and other predetermined agencies or persons. The Remote Control 90 will allow authorities to remotely alter the previously described system operational parameters.

Figure 5:
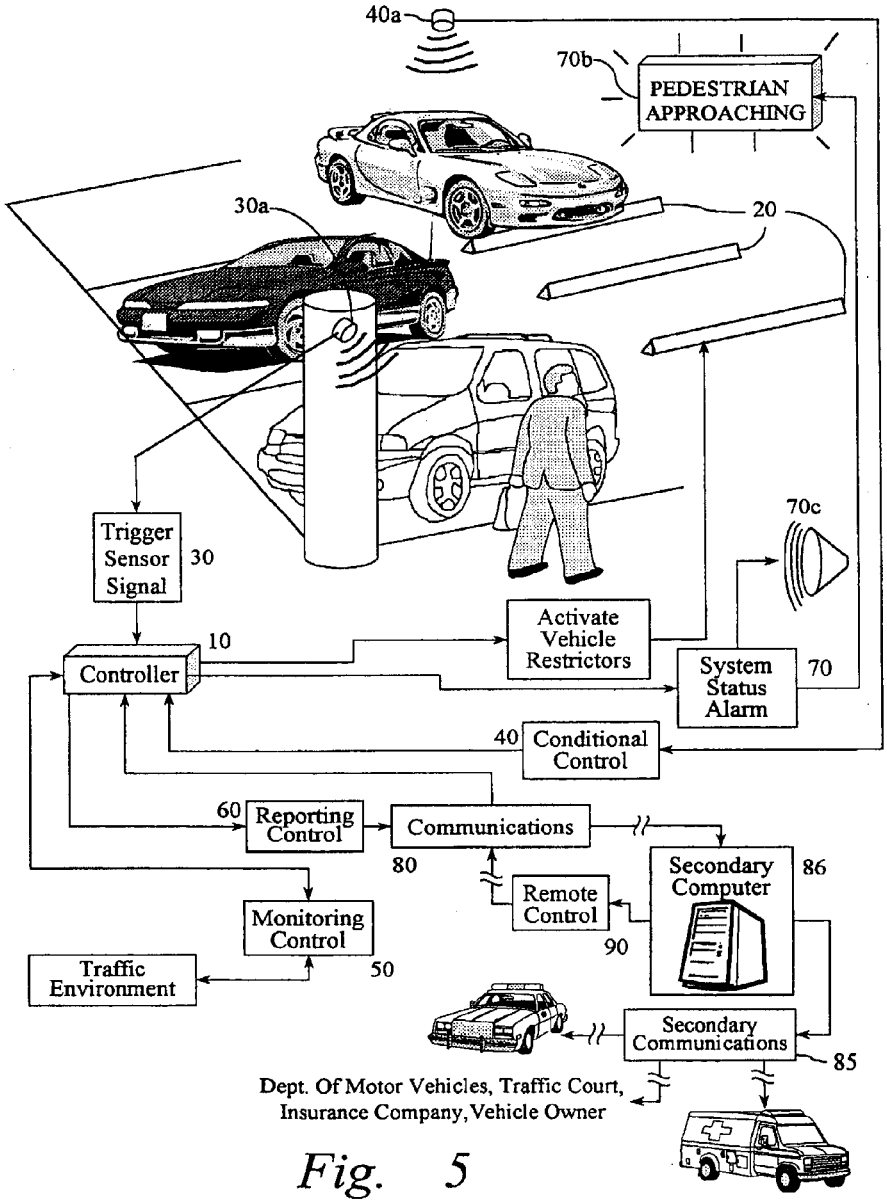
FIG. 5 is a depiction of the Collision Avoidance System preventing vehicle-to-pedestrian collisions when the operator does not see an approaching pedestrian.

FIG. 5—Blind Corners And Unseen Pedestrians

The Collision Avoidance System provides pedestrian protection in situations in which the views of the pedestrian and the operator are restricted and a possible collision is forthcoming. An example is the parking facility in FIG. 5. The Trigger Sensor Signal 30 input is provided by a pedestrian detector 30a, similar to those in the entrance of grocery stores used to open doors. It is positioned to monitor a pedestrian area that precedes an intersection where a vehicle-to-pedestrian collision might occur. As the pedestrian and the vehicle advanced toward the same intersection, the Trigger Sensor 30a notifies the Controller 10 to activate the Vehicle Restrictors 20, to provide an indication to the operator to slow down. Additional reinforcement is provided when the Controller 10 illuminates a System Status Alarm 70 display 70b in direct view of the driver, to inform of the pedestrian's presence. The system can also activate an alarm 70c directed at the pedestrian to alert him to his impending collision with the vehicle. An example is the audible annunciation of a car horn sound through a nearby speaker. Although the horn annunciation does not come from the vehicle it will alert the pedestrian to the presence of the vehicle. Conditional Control 40 is provided by a sensor 40a that is used to detect the presence of a vehicle traveling in the direction of the intersection such as one or more ultrasonic sensors. (A ground-mounted induction loop would also suffice.) The Conditional Control 40 sensor 40a will only allow the Controller 10 to activate the Vehicle Restrictors 20 and the System Status Alarm 70 components (70b, 70c) if there is a vehicle traveling toward the intersection, thus preventing unnecessary system activation.

An obvious question is why not simply place traditional static speed breakers to always restrict vehicle speed? The Collision Avoidance System allows efficient traffic for any situation in which it is installed. Efficient traffic is defined as the safest traffic at the fastest speed, which will depend on the circumstance and thus will not always be the same speed. Therefore, the vehicle is allowed to travel safely at a faster speed as long as a pedestrian is not in danger of being struck. Also, static speed breakers do not invoke the same level of operator alertness because drivers expect them to be there. Conversely, the sudden activation of Vehicle Restrictors 20 will capture the operator's attention and invoke a greater caution.

Authorities can limit and enforce a maximum vehicle speed, even in the absence of a pedestrian. This is accomplished by setting the Controller 10 to also respond to Conditional Control 40 sensors 40a for speed control as described for FIGS. 2 and 3. This additional usage will prevent the vehicle shown from colliding with a vehicle traveling in the transverse direction and further emphasizes the flexibility of the Collision Avoidance System.

The Monitoring Control 50, Reporting Control 60, and Communications 80 will perform as previously described to capture, document, and report any violations and collisions to authorities. If the Collision Avoidance System is monitoring private property, then the Reporting Control 60 will reference the names and contact information for those predetermined individuals from its contact database. As previously described the Secondary Communications 85 and Secondary Computer 86 will relay reportable incidents to patrolling police officers, emergency medical personnel, and other predetermined agencies or persons. The Remote Control 90 will allow authorities to remotely alter the previously described system operational parameters.

Figure 6:
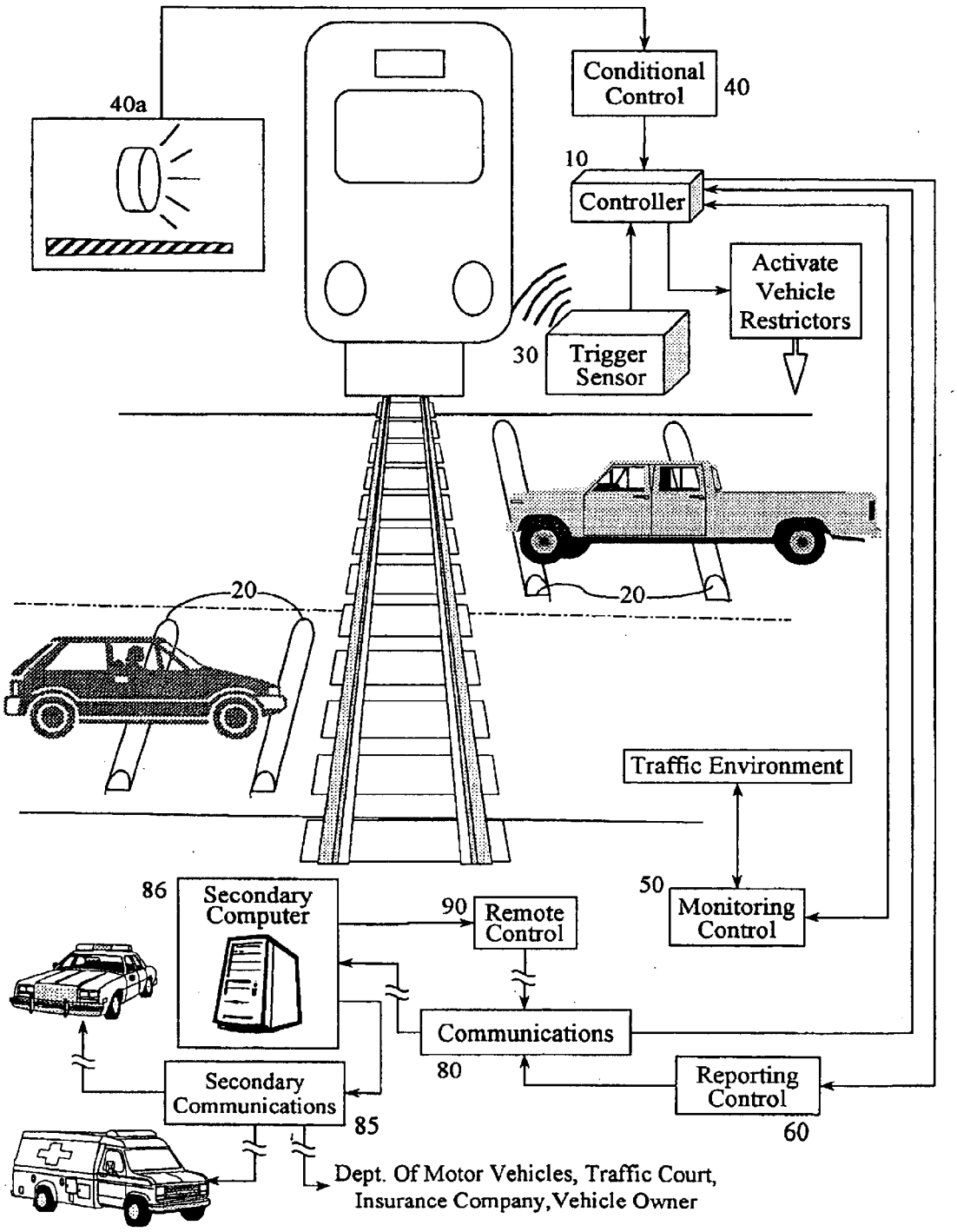
FIG. 6 is a view of the Collision Avoidance System restricting the position of vehicles to prevent collision with a train.

FIG. 6—Rail And Road Intersections

The Office of Public Affairs/Federal Railroad Administration quotes the following facts regarding collisions at highway-railroad intersections: There are nearly 280,000 highway-rail crossings nationwide. During 1994, 610 people were killed and 1,923 injured in 4,921 highway-rail crossing collisions. A train hits someone in America nearly every 90 minutes and an operator is 30 times more likely to die in an accident involving a train than in a collision with another motor vehicle.

Collisions between trains and vehicles often occur when motorists speed up to cross the railroad tracks in an effort to beat the oncoming train. Even at slow speeds, trains are practically impossible to stop in time to prevent a collision with a vehicle. The Federal Railroad Administration says that over 50% of collisions at public crossings occur where active warning devices (gates, lights, and bells) exist and function properly. Obviously the warning devices are not always sufficient to capture an operator's attention as well as to discourage racing of the train. One way to reduce collisions at highway-railroad intersections is with the timely and physical restraint of vehicles as a train nears the intersection.

The Collision Avoidance System configuration for preventing vehicle-to-train collisions is presented in FIG. 6. A sensor capable of detecting the presence of the train is the Trigger Sensor 30. This technology could be based on vibration, ultrasonic, or disruption of a light signal. Since trains are the only machines that travel on the track the technology used to detect them is not particular. The initial presence of the train is not enough for the Controller 10 to activate the Vehicle Restrictors 20. This prevents unnecessary activation is case the train only parks in the area. However, as the train approaches the intersection it eventually activates the caution lights and the gates 40a that extend across the lanes. These devices provide the Conditional Control 40 that actually completes the indication to the Controller 10 to deploy the Vehicle Restrictors 20. Consequently, motorists approaching the intersection receive tactile feedback that makes it significantly more difficult to increase vehicle speed and race the train to the intersection.

Obviously another configuration for this implementation is to trigger the system directly from the activation of the cation lights and gates 40a. However, the described configuration is likely more reliable since it always ensures that the train is actually present before disrupting traffic. Thus the presence of the train and activation of the crossing controls 40a provide a double contingency for system activation. The Monitoring Control 50, Reporting Control 60, and Communications 80 will perform as previously described to capture, document, and report any violations and collisions to authorities. In this scenario, the Reporting Control 60 contact database will include railroad authorities. As previously described the Secondary Communications 85 and Secondary Computer 86 will relay reportable incidents to patrolling police officers, emergency medical personnel, and other predetermined agencies or persons. The Remote Control 90 will allow authorities to remotely alter the previously described system operational parameters.

Figure 7:
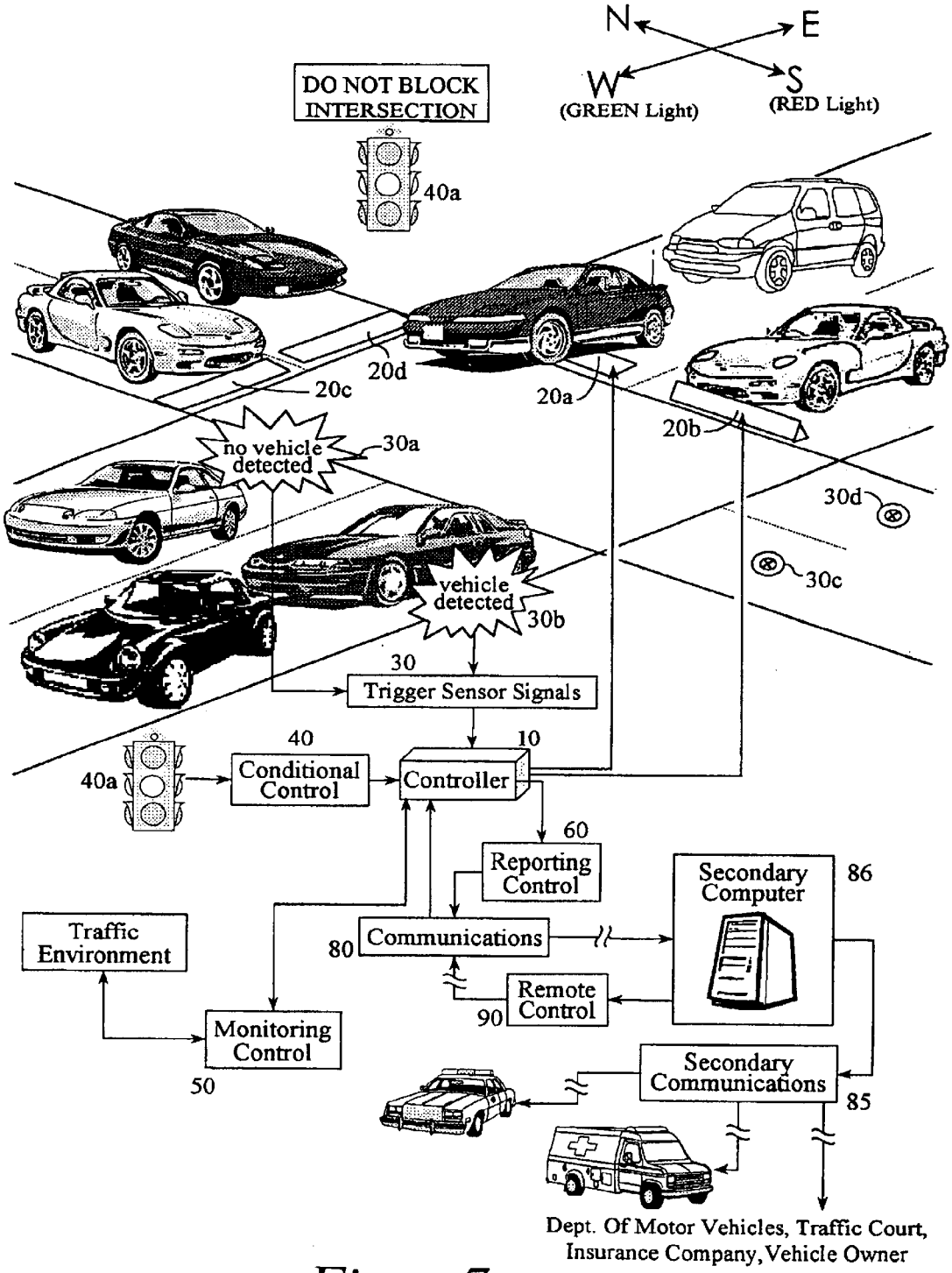
FIG. 7 shows the Collision Avoidance System restricting the position of vehicles to prevent collisions at a traffic light intersection.

FIG. 7—Traffic Light Intersections

The National Highway Traffic Safety Administration provides the following statistics and facts regarding collisions at intersections: Intersections are among the most dangerous locations on U.S. roads. Approximately 1.95 million collisions occurred at intersections in 1994 (representing 30% of total collisions), causing over 6,700 fatalities and significant numbers of serious injuries. There are more intersection collisions than any other collision type. The NHTSA also says that it is also more technically challenging to prevent this type of collision with detection and warning technology than other collision situations.

The Collision Avoidance System prevents collisions at traffic intersections by restricting vehicle position, in accordance to traffic regulations. An additional benefit is the reduction of traffic congestion that is caused when vehicles block an intersection. Collisions are frequently caused by frustrated motorists trying to get through congested traffic. Consider the typical events at an intersection during times of high traffic volume. As the light turns green, vehicles proceed into an intersection until the density of the traffic causes the lanes on the exit-side of the intersection to fill. Unfortunately, motorists often continue to drive into the intersection in anticipation that they will clear the intersection before their light turns red. Typically those vehicles continue to block the intersection when the light turns green for traffic travelling in the transverse direction. As a result, transverse traffic can not proceed into the intersection and traffic density continues to accumulate. Motorists are frustrated as they go through several traffic light cycles with little advancement. Thus when they finally get to the intersection they are more likely to contribute to additional congestion by forcing their way into the intersection and blocking traffic that is transverse to them. This entire scenario increases the potential for collisions.

FIG. 7 illustrates the Collision Avoidance System preventing collisions at an intersection during a high congestion period. Vehicle Restrictors 20a, 20b, 20c, 20d are installed on the entry-side of the intersection in order to control access to the intersection. A green light allows westbound vehicles to proceed through the intersection until the vehicles begin to fill the lanes on the exit-side of the intersection. Vehicle detection sensors 30a, 30b provide the Trigger Sensor Signals 30 and are installed on the exit-side of the intersection's westbound lanes. These sensors 30a, 30b are located so that their output allows the Controller 10 to determine that the left lane is occupied while the right lane can accommodate another vehicle without blocking the intersection. The Controller 10 activates the restrictors on the westbound entry-side of the intersection in accordance to the indications from the sensors 30a, 30b. As a result the left lane of the westbound Vehicle Restrictor 20b activates to prevent the vehicle from entering the intersection. The right lane Vehicle Restrictor 20a is deactivated to allow at least one more vehicle to cross the intersection. Thereafter the sensor 30a in the right lane on the exit-side will indicate to the Controller 10 to deploy the Vehicle Restrictor 20a on the entry-side to prevent additional vehicles from entering the intersection. The Collision Avoidance System will minimize the blocking of the intersection thus allowing southbound traffic open access to the intersection when the southbound light turns green. The Vehicle Restrictors 20c, 20d and the Trigger Sensors 30c, 30d support the implementation of the same concept for the movement of southbound traffic.

It is vital that the Vehicle Restrictors 20a, 20b, 20c, 20d not be deployed and unnecessarily impede traffic flow if traffic congestion is not an issue. The determination of a congested lane on the exit-side of an intersection is really a determination of traffic density. Traffic density is defined as the number of vehicles that move pass the sensor in a given period of time. A Vehicle Restrictor 20a, 20b, 20c, 20d is only activated if the corresponding Trigger Sensor 30a, 30b, 30c, 30d indicates to the Controller 10 that the same vehicle has been positioned at the edge of the exit-side of the intersection for a period of time that is consistent with traffic congestion.

The Conditional Control 40 is provided by the traffic light 40a so that the Controller 10 governs system response accordingly. Traffic administrators may decide that activation of vehicle restrictors should only occur if traffic is congested in the direction that has a green light, as describe above, to prevent blocking of the intersection. The alternate response to the Conditional Control 40 traffic light 40a is to also activate the Vehicle Restrictors 20c, 20d for the traffic that has a red light. This action serves to reinforce the red light to prevent motorists from trying to anticipate the changing of their light from red to green, thus further preventing a collision. The fact that either or both responses could be exercised depends on the Controller's 10 programming logic and further emphasizes the flexibility of this invention.

The Monitoring Control 50, Reporting Control 60, and Communications 80 will perform as previously described to capture, document, and report any violations and collisions to authorities. As previously described the Secondary Communications 85 and Secondary Computer 86 will relay reportable incidents to patrolling police officers, emergency medical personnel, and other predetermined agencies or persons. The Remote Control 90 will allow authorities to remotely alter the previously described system operational parameters.

It must be noted that the vehicle speed control and pedestrian protection previously discussed in FIG. 3 are also applicable in FIG. 7. The programming logic of the Controller 10 will allow the system to perform in whatever way traffic administrators desire. Again the flexibility of the Collision Avoidance System is evident as it can be configured to simultaneously prevent many collision situations.

Figure 8:
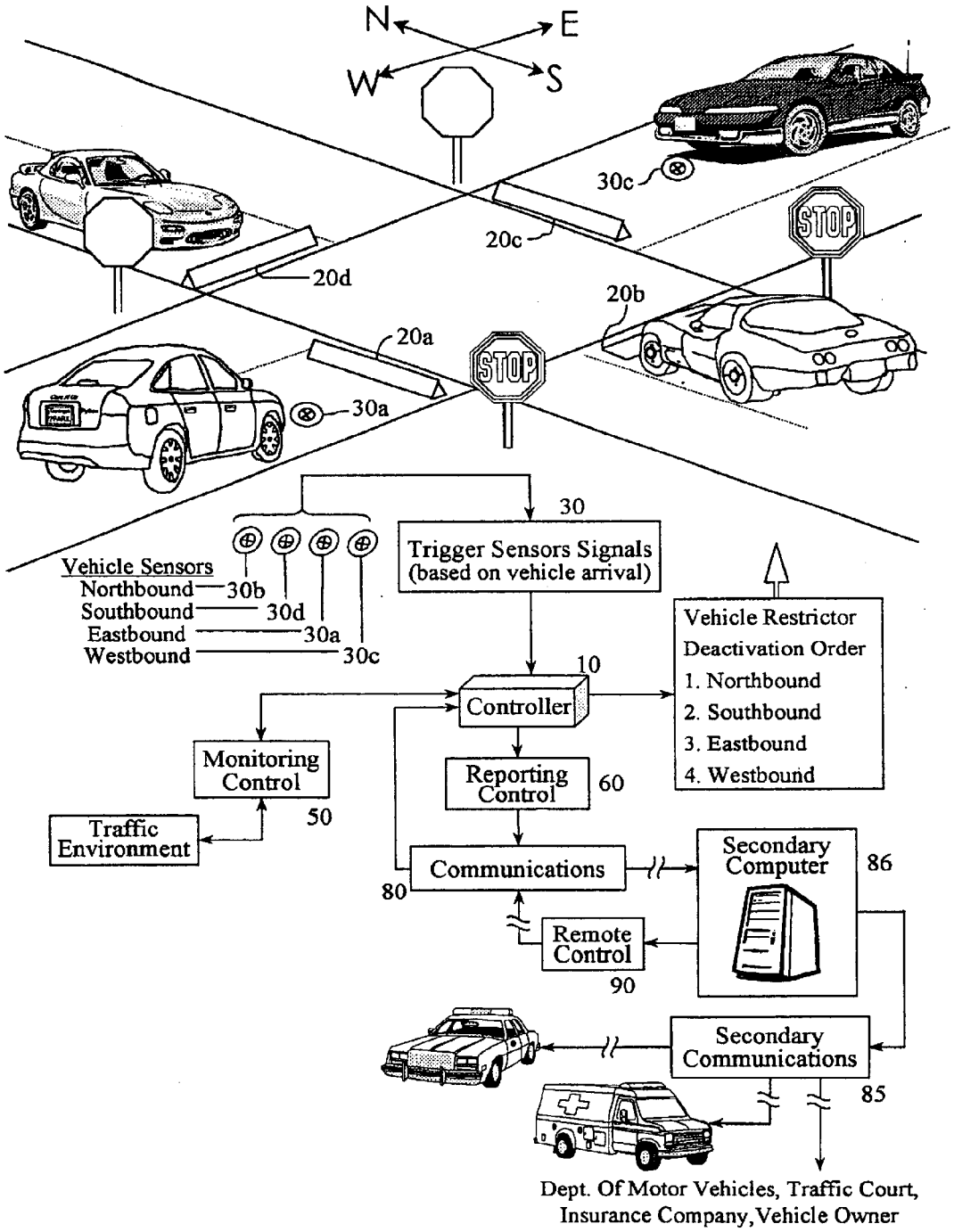
FIG. 8 is an illustration of the Collision Avoidance System preventing a collision by reinforcing the vehicle progression order at a four-way intersection.

FIG. 8—Four-Way Intersections

The benefits of the Collision Avoidance System are also applicable to an intersection without a traffic light such as the four-way intersection in FIG. 8. This is the type of intersection in which the front end of one vehicle hits another vehicle broad side. The major difference in the hardware configurations of FIGS. 7 and 8 is that the vehicle detection sensors triggering the Collision Avoidance System response are positioned on the entry-side of the intersection in FIG. 8. The Trigger Sensors 30a, 30b, 30c, 30d detect a vehicle and are sufficiently positioned in advance of the intersection in order to give the operator a chance to see and respond to the activation of the Vehicle Restrictors 20a, 20b, 20c, 20d. (The northbound sensor 30b and southbound sensor 30d are not visible on the street because the corresponding vehicles are covering them.)

Since there is no traffic light to govern a vehicle's progression into the intersection, the progression order is determined by the arrival order of the vehicles at the intersection. The northbound sensor 30b detects the presence of a vehicle first. The Controller 10 deactivates the northbound Vehicle Restrictor 20b to allow the northbound vehicle to enter the intersection while deploying the other Vehicle Restrictors 20a, 20c, 20d to restrict the other vehicles. The Controller 10 will subsequently deactivates the remaining Vehicle Restrictors 20a, 20c, 20d according to the order in which the corresponding Trigger Sensors 30a, 30c, 30d detected the presence of a vehicle. Simultaneous vehicle arrivals will be controlled according to right-of-way regulations.

The Monitoring Control 50, Reporting Control 60, and Communications 80 will perform as previously described to capture, document, and report any violations and collisions to authorities. As previously described the Secondary Communications 85 and Secondary Computer 86 will relay reportable incidents to patrolling police officers, emergency medical personnel, and other predetermined agencies or persons. The Remote Control 90 will allow authorities to remotely alter the previously described system operational parameters.

Figure 9:
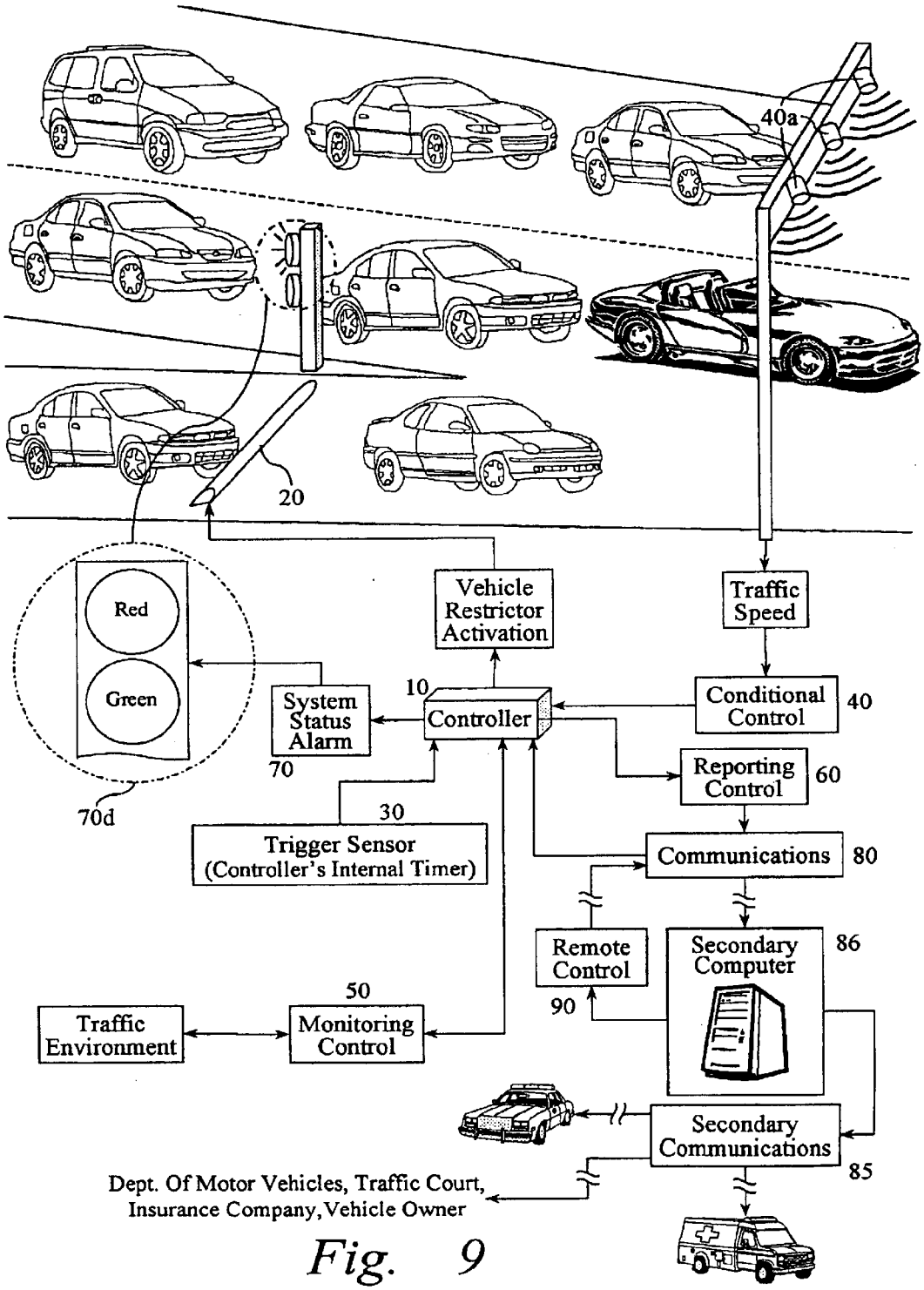
FIG. 9 is a depiction of the Collision Avoidance System preventing a collision by controlling the merging of vehicles onto an interstate highway.

FIG. 9—Merging With Highway Traffic

A merging-lane traffic light is one method that transportation authorities use in an attempt to control rush hour traffic on interstate highways. The light alternates green and red on a timed sequence to indicate to motorists when to proceed to merge with the highway traffic from a side entrance. FIG. 9 illustrates the Collision Avoidance System reducing the potential for vehicular collisions with merging lanes of traffic. The internal timer of the Controller 10 serves as the Trigger Sensor 30. The sequence of the timer is programmed (through the Remote Control 90) to match the timing used for the traditional merging-lane traffic light. Sensors 40a that detect vehicle speed in each highway lane as well as the merging acceleration lane provide Conditional Control 40. The Controller 10 uses the vehicle speed inputs to increase or decrease the baseline timing (Trigger Sensor 30) and subsequently adjust the activation timing of the merging-lane traffic light 70d (System Status Alarm 70) and the Vehicle Restrictor 20. When highway traffic is very congested the Collision Avoidance System will actually slow the rate at which the emerging traffic enters the highway. Conversely, as highway traffic lessens then the system will increase the merging rate. If most highway vehicles are traveling above a predetermined threshold speed (as determined by the sensors 40a providing Conditional Control 40) then the Controller 10 will continuously display green on the merging-lane traffic light 70d as the System Status Alarm 70. If some incident occurs downstream from the Collision Avoidance area that eventually causes the traffic to slow below a predetermined threshold then the system will automatically adjust the merging-lane traffic light 70d as the System Status Alarm 70 and the Vehicle Restrictor 20 accordingly. Setting the predetermined threshold speeds is done through the Remote Control 90.

The traditional merging-lane traffic light uses a static time sequence and thus does not have a feedback loop from the very traffic that it is controlling access to. Also, these lights are generally set to only operate during the predetermined morning and evening rush hours. The Collision Avoidance System provides three major benefits that are not available with only the traditional merging-lane traffic light and not available outside of this invention. The first is the synchronization of the merging-lane traffic light 70d with the physical control of the vehicle preparing to merge. This will reduce premature starts by motorists attempting to merge before the green light indication. The second benefit is the capability to automatically adjust merging traffic as a function of the existing highway congestion. The third benefit is collision prevention control 24 hours a day and not only at predetermined rush hours. Again, the Collision Avoidance System allows efficient traffic, the safest traffic at the fastest speed.

The Monitoring Control 50, Reporting Control 60, and Communications 80 will perform as previously described to capture, document, and report any violations and collisions to authorities. As previously described the Secondary Communications 85 and Secondary Computer 86 will relay reportable incidents to patrolling police officers, emergency medical personnel, and other predetermined agencies or persons.

Figure 10:
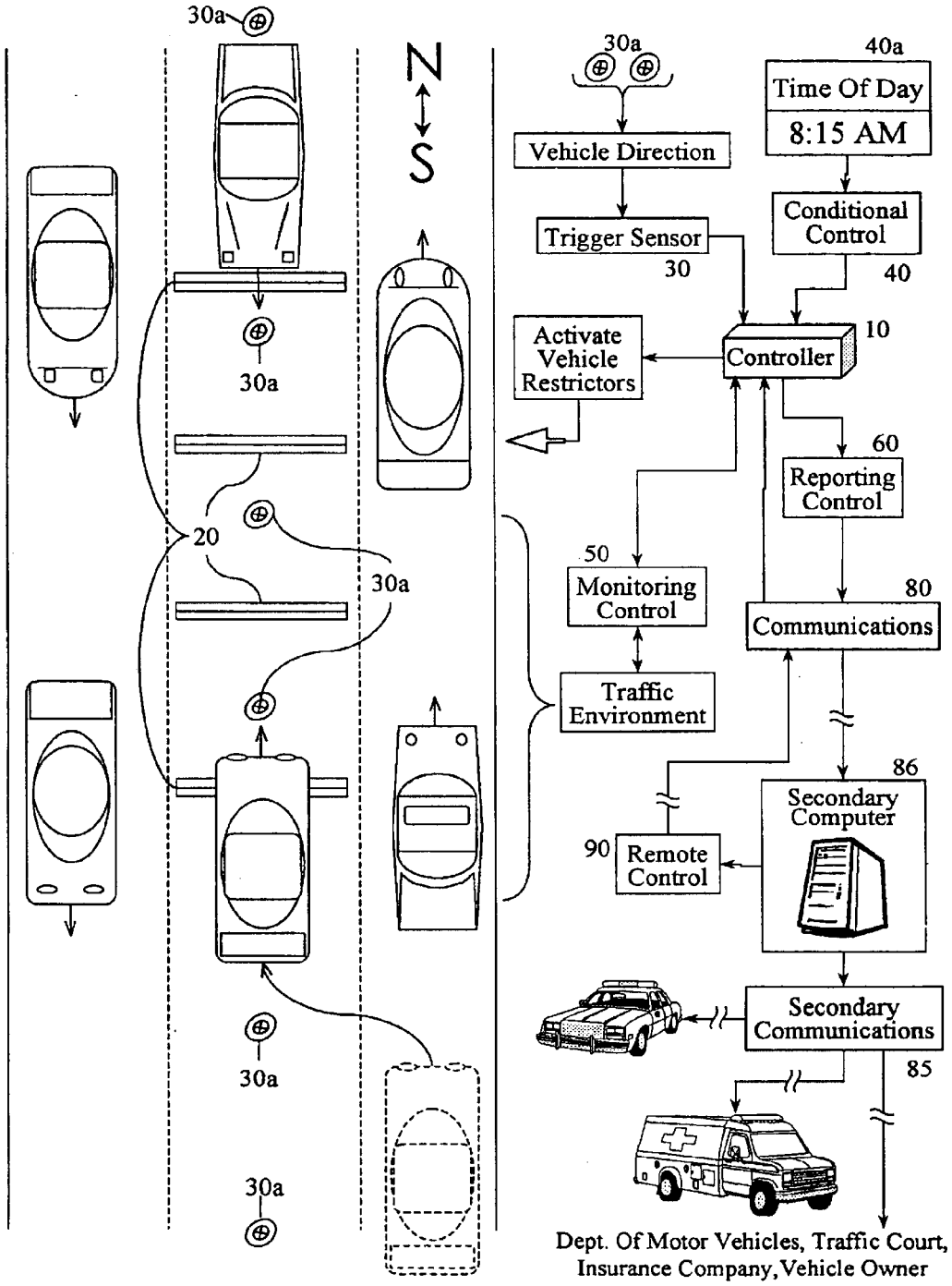
FIG. 10 is a view of the Collision Avoidance System preventing a head-on collision by reinforcing directional lane control.

FIG. 10—Head-On Collisions & Lane Control Reinforcement

The Fatality Analysis Reporting System's 1998 statistics indicate that there were 5,243 head-on collisions involving 18,197 people and 11,324 vehicles. A notable solution to reduce these numbers is to provide more forewarning to motorists of a potential collision. This will improve both operator alertness and response time.

FIG. 10 is an overhead view of the Collision Avoidance System preventing head-on collisions on a street with a bi-directional middle lane. During the morning hours the middle lane is used to accommodate the heavier southbound traffic. However, in the afternoon the middle lane is intended for traffic in the northbound direction. Although the appropriate signs are posted over the middle lane, the vehicle at the bottom of the figure (indicated by the dotted-line trace) has crossed into the middle lane. This vehicle and a second vehicle in the middle lane are approaching a head-on collision. The detection of a vehicle between successive proximity sensors 30a provides Trigger Sensor 30 input to allow the Controller 10 to determine the direction of a vehicle in the middle lane. The internal time clock 40a of the Controller 10 is the Conditional Control 40 and is referenced to determine the proper direction of travel for middle lane traffic, based on the time of day. The Controller 10 activates the Vehicle Restrictors 20 to alert both motorists to slow down. This early warning will drastically improve the reaction time of both operators and prevent the head-on collision. Because Vehicle Restrictors 20 can be individually controlled, the system can exclusively activate the Vehicle Restrictors 20 that are between the two approaching vehicles. This prevents the disturbance to vehicles that are also in the middle lane but not in danger of a collision. The system will deactivate the deployed Vehicle Restrictors 20 when all vehicle movement within the middle lane is in the proper direction. Although it is not depicted in FIG. 10, the Controller 10 will also update overhead electronic displays (System Status Alarm) to further inform the errant operator of the improper direction of travel. Since the middle lane is bi-directional the overhead electronic displays facing the operator traveling in the proper direction will be updated to inform of an approaching vehicle.

The Monitoring Control 50, Reporting Control 60, and Communications 80 will perform as previously described to capture, document, and report any violations and collisions to authorities. As previously described the Secondary Communications 85 and Secondary Computer 86 will relay reportable incidents to patrolling police officers, emergency medical personnel, and other predetermined agencies or persons. The Remote Control 90 will allow authorities to remotely alter the previously described system operational parameters.

Figure 11:
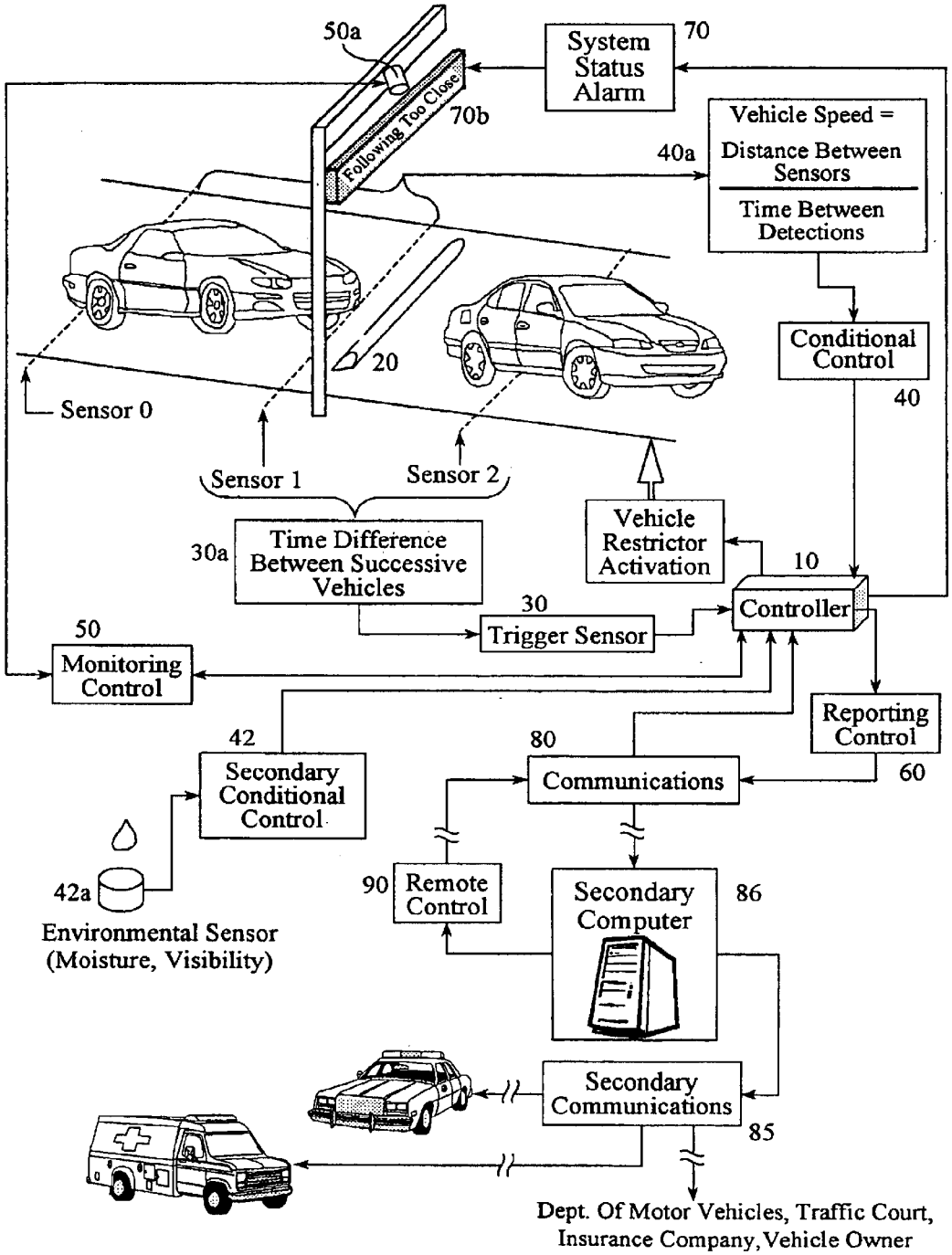
FIG. 11 shows the Collision Avoidance System preventing a rear-end collision by reinforcing the proper traveling distance between vehicles.

FIG. 11—Rear-End Collisions

The Fatality Analysis Reporting System's 1998 statistics indicate that there were 1,896 rear-end collisions involving 7,837 people and 4,846 vehicles. FIG. 11 illustrates two vehicles traveling in a lane of traffic. The dotted lines represent the road locations in which a vehicle will be detected by Sensor 0, Sensor 1, and Sensor 2. The technology for vehicle detection could be a loop coil, ultrasonic or disruption of a light beam by a passing vehicle between an optical transmitter/receiver pair. The Trigger Sensor 30 is actually the time difference between the passing of two successive vehicles, as shown between the activation of Sensor 1 and Sensor 2. As long as that time difference exceeds the time difference that is consistent with maintaining the proper distance between vehicles then the Controller 10 is not triggered.

The posted speed limit sets the baseline time threshold of system activation. The speed limit and the baseline time threshold can be changed through the Remote Control 90. To avoid rear-end collisions for a given speed limit, operators are supposed to allow a certain number of seconds between the time that a preceding vehicle passes a point in the road and the time when their vehicle passes the same point. However, safe travel can still be maintained with lesser times as long as the speed of the trailing vehicle is reduced accordingly. Conversely, if the speed of the trailing vehicle is greater than the speed limit then more time must pass between successive vehicles. Thus the speed of the trailing vehicle will dictate the extent of an increase or decrease in the baseline time difference between two successive vehicles to maintain a safe travelling distance. The same sensors can be used to determine the speed of the trailing vehicle. As the trailing vehicle reaches Sensor 1, the vehicle's speed is determined by dividing the known distance between Sensor 0 and Sensor 1 by the time difference between the activation of Sensor 0 and Sensor 1.

When the trailing vehicle reaches Sensor 1, the time difference since the passing of the leading vehicle (Trigger Sensor 30) indicates that the trailing vehicle may be following too closely. That determination will be confirmed or refuted by the speed of the trailing vehicle 40a, which serves as the Conditional Control 40. Even if the time between successive vehicles is less than the baseline time as dictated by the speed limit, the trailing vehicle may still be at a safe distance to stop in time to avoid a rear-end collision if the trailing vehicle's speed 40a has been sufficiently reduced. However, in FIG. 11 the speed of the trailing vehicle 40a (Conditional Control 40) confirms that the trailing vehicle is driving too closely. The Controller 10 activates the Vehicle Restrictor 20 and updates the overhead display 70b as the System Status Alarm 70 to inform the driver that he is following too closely. The height of the Vehicle Restrictor 20 can even be deployed in proportion to the additional distance the trailing vehicle should attain in order to follow at the minimum safe distance. This feedback provides more aggressive restraint to a vehicle that is dangerously close to the preceding vehicle but conversely not invoke too much speed reduction for a vehicle that is not. The purpose is to achieve the safest traffic at the fastest speed.

An additional Conditional Control 42 input is provided by a moisture sensor 42a to detect when the road is wet. The purpose is to increase the traveling distance between vehicles since wet roads increase the braking distance. The Controller 10 will factor in the additional input by increasing the required time between vehicles and governing system response accordingly. The Monitoring Control 50 and camera 50a, Reporting Control 60, and Communications 80 will perform as previously described to capture, document, and report any violations and collisions to authorities. As previously described the Secondary Communications 85 and Secondary Computer 86 will relay reportable incidents to patrolling police officers, emergency medical personnel, and other predetermined agencies or persons. A previously described speed limit display can be added to this implementation. Authorities using the Remote Control 90 can alter the baseline speed limit.

Figure 12:
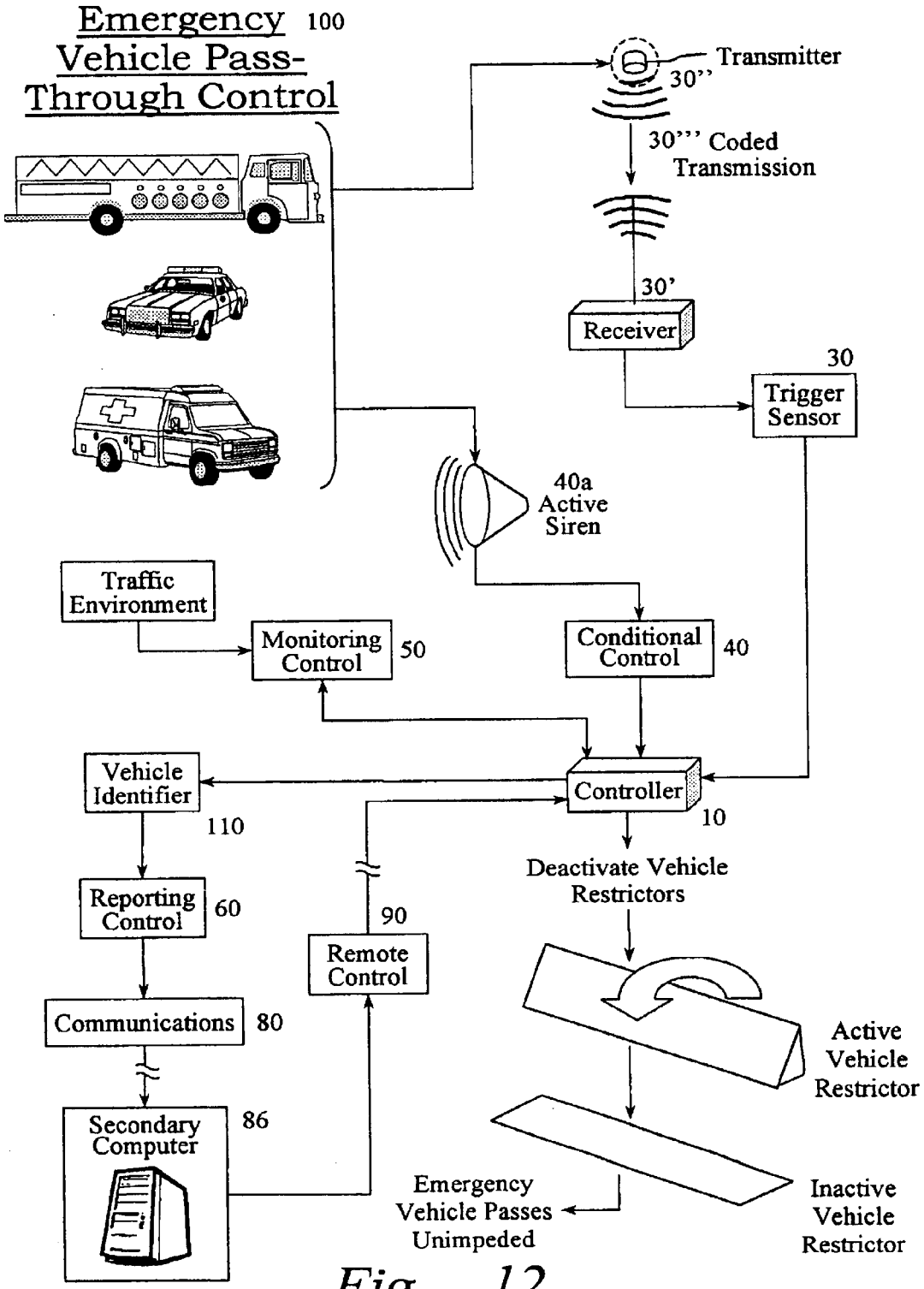
FIG. 12 is an illustration of how the Collision Avoidance System allows an emergency vehicle to pass unimpeded with the Emergency Vehicle Pass-Through Control.

FIG. 12—Emergency Vehicle Pass-Through

The Collision Avoidance System will allow emergency vehicles to pass unimpeded. FIG. 12 shows the Emergency Vehicle Pass-Through Control 100 of the Collision Avoidance System. An emergency vehicle is equipped with a concealed Transmitter 30" matched to the frequency of a Receiver 30' that provides input into the Controller 10. The Transmitter I Receiver pair serves as the Trigger Sensor 30. The Transmitter 30" is integrated with the siren of the emergency vehicle so that the Transmitter 30" is only active when the siren is on. Thus the activity of the siren 40a provides Conditional Control 40. This feature prevents the emergency vehicle from disabling the Collision Avoidance System when the vehicle is not responding to an emergency call. Even emergency vehicles must comply with the standard traffic regulations in the absence of an emergency.

The functions of the system components in executing the Emergency Vehicle PassThrough Control 100 are the same as the previous implementations except that the principle output response is deactivation of Vehicle Restrictors instead of activation. As the emergency vehicle nears a Collision Avoidance System installation with an active siren 40a, the Transmitter 30" communicates wireless, Coded Transmissions 30'" to the Receiver 30'. The Receiver 30' indicates to the Controller 10 that a deactivation signal was transmitted from an approaching emergency vehicle in an emergency mode. The Controller 10 deactivates all Vehicle Restrictors to an inactive state. Shortly after the passing of the emergency vehicle the Controller 10 will restore the system and the Vehicle Restrictors 20 to normal operation.

The transmissions between the Transmitter 30" and the Receiver 30' are coded so that the system does not respond to stray signals. Only transmissions at the proper frequency and in the proper format will be acknowledged. The Coded Transmission 30'" will include a unique vehicle identifier of the approaching vehicle. The Monitoring Control 50 may also be invoked if photographs are desired of the emergency vehicle as it passes through the monitored area. Thus the vehicle identifier 110 along with the date and time of the deactivation occurrence (and photographs if taken) are compiled by the Reporting Control 60 and transmitted to authorities through the Communications 80 interface. This documentation will reside on the computer 86 of the Secondary Communications 85. The request to take photographs of passing emergency vehicle will be made or cancelled by authorities through the Remote Control 90.

The Emergency Vehicle Pass-Through Control 100 is functionally applicable to any Collision Avoidance System implementation. However, all situations may not be suited for the Emergency Vehicle Pass-Through Control 100. For example, transportation authorities may not want emergency vehicles, even in an emergency, to be able to deactivate the Vehicle Restrictors as the vehicle approaches the train intersection in FIG. 6.

Closing

Numerous scenarios were presented to demonstrate the flexibility of the Collision Avoidance System to prevent vehicle-related collisions in virtually any situation. The design of the streets, number of lanes, terrain (hills, curves, dips), vehicular traffic volume, pedestrian traffic volume, local climate, and posted speed limit are just a few of the variables that can produce an environment with particular safety concerns. The depicted uses do not represent the limits of this invention. For example, the Collision Avoidance System can provide intersection control even if the northbound and southbound traffic in FIG. 8 was designed to always have the right-of-way before the eastbound and westbound traffic. As the four vehicles simultaneously approached the intersection the system would still determine the proper order of vehicle progression and restrict the vehicles accordingly.

Another situation with high potential for vehicle-to-pedestrian collision is the left turn of a vehicle off a main street and through a pedestrian crossing. The depiction and explanation of FIG. 5 are also applicable to this scenario because both situations represent an operator with a limited view of or attention to a pedestrian as the vehicle and the pedestrian proceed toward the same intersection.

The configuration of FIG. 10 will also prevent collisions if a vehicle enters a one-way street in the wrong direction. Trigger Sensors would detect the vehicle at the beginning of the one-way entrance and invoke the Controller to deploy Vehicle Restrictors to the wayward vehicle with accompanying displays (System Status Alarm) to indicate that the operator is traveling in the wrong direction. Vehicle Restrictors and System Status Alarms indicating the approach of the wayward vehicle would also be deployed to vehicles travelling in the proper direction to slow them down and also give them forewarning.

The primary depicted use of the Conditional Control was to cancel or complete the preliminary output responses of the system. However, FIG. 11 demonstrates that a Secondary Conditional Control 42 can also be used to alter an operational parameter based on environmental conditions such as rain or fog. For example, road moisture or reduced visibility will increase the baseline time that determines the safe traveling distance between vehicles. This type of input allows the Collision Avoidance System to automatically adjust to changes in weather conditions that will demand changes in driving behavior in order or to prevent collisions. Vehicle speed on a wet road is a typical example. The speed limit could be automatically lowered when the road becomes wet but automatically returned to the baseline speed limit as the road dried. Speed limit displays would keep the operators informed of the current speed limit, Vehicle Restrictors would reinforce the changes, and the Reporting Control would inform authorities of the changes that were made as well as report any violations. Thus it is to be understood that use of a Conditional Control input to monitor environmental changes (such as precipitation) that could affect driving conditions and adjust system responses accordingly are also applicable to previous depictions of the Collision Avoidance System.

Regardless of the traffic scenario, the mission of the Collision Avoidance System is to prevent collisions through actions comprising: monitoring the environment according to the traffic laws or safety concerns, providing notification to the operator regarding the actions to prevent a collision, impeding the proper vehicles in an effort to prevent the collision, documenting and reporting to authorities any failure to heed to those traffic laws or safety concerns. It is to be understood that the present invention is not limited to any of the embodiments described above, but encompasses any and all embodiments within the scope of the following claims.

What I claim as my invention is:

1. A collision avoidance system[,] *for use involving at least one vehicle, said collision avoidance system* comprising:

a) [a plurality of vehicle trigger sensors each] *at least one trigger sensor* associated with a roadway, [each said vehicle] *said at least one* trigger sensor capable of sensing at least one parameter [of one or more vehicles];

b) [a plurality of vehicle restrictors each] *at least one vehicle restrictor* associated with said roadway, [each said] *said at least one* restrictor comprising a[n elongate] member disposed generally transverse to said roadway, each said restrictor capable of being actuated [to raise or lower relative to said roadway surface] to impede passage thereover [of said] *of the at least one* vehicle[s]; and c) a controller programmed to determine [the] *an increased* likelihood of a collision [between] *involving* any of [said] *the at least one* vehicle[s] based on said [vehicle] parameter[s] received from *or by* said trigger sensor[s], programmed to determine [which of a selected one or more of said vehicles] *that the at least one vehicle* should be slowed or stopped [to avoid said collision] based on said [vehicle] parameter[s and based on local traffic laws], and programmed to determine at least one [selected] vehicle restrictor that is being approached by [said selected] *the at least one* vehicle, wherein said at least one [selected] vehicle restrictor is actuated by communication from said controller to impede the passage of [said selected] *the at least one* vehicle [to avoid said collision].

2. The collision avoidance system of claim 1, wherein said at least one [vehicle] parameter is selected from the group [consisting] *comprised* of vehicle presence, position, direction, or speed.

3. The collision avoidance system of claim 1, wherein said at least one trigger sensor is selected from the group [consisting of] *of technologies capable of detecting vehicle parameters comprising* radar devices, lasers, optical devices, ultrasonic devices, induction loop devices, wireless transmitters and receivers, pressure-responsive switches, [and] *or* combinations thereof.

4. The collision avoidance system of claim 1, [wherein said] *further comprising* at least one [trigger sensor comprises an] environmental sensor to indicate roadway moisture or sight visibility.

5. The collision avoidance system of claim 4, wherein said controller is programmed to determine said *increased* likelihood of said collision further based on roadway surface friction loss due to moisture or sight visibility loss, [due to moisture] as communicated to said controller from said environmental sensor.

6. The collision avoidance system of claim 1, wherein said at least one trigger sensor is mounted on a generally vertical post adjacent said roadway or on a generally horizontal arm supported above said roadway.

7. The collision avoidance system of claim 1, further comprising a control that receives said [vehicle] parameter comprising the speed of [said selected] *the at least one* vehicle and that determines an amount of [raising or lowering of the selected] vehicle restrictor *activation* which [amount] is selected to be sufficient to slow or stop the *at least one* vehicle [to avoid said collision].

8. The collision avoidance system of claim 1, further comprising a monitoring device associated with said roadway and in [real time] communication with emergency law enforcement, medical, [or] fire department *or other predetermined* personnel.

9. The collision avoidance system of claim 8, wherein said at least one monitoring device comprises [a] *at least one* camera.

10. The collision avoidance system of claim 1, further comprising [an] *at least one* emergency vehicle pass-through control that deactivates the actuation of [the] *said at least one* vehicle restrictor[s] in response to a communication from an emergency law enforcement, medical, or fire department vehicle *or other predetermined vehicle or person*.

11. The collision avoidance system of claim 1, further comprising:

a) [a plurality of] *at least one* pedestrian trigger sensor[s each] associated with said roadway, each said pedestrian trigger sensor capable of sensing at least one parameter of one or more pedestrians; *and* b) [at least one alarm associated with said roadway to alert operators of said vehicles of an approaching pedestrian to avoid collision; and]

c) said controller programmed to determine [the] *an increased* likelihood of a collision between said pedestrian and [any of said vehicles, and to select and activate said alarm] *the at least one vehicle* and to [select and] activate said [selected] vehicle restrictor [immediately] in the path of [said selected] *the at least one* vehicle.

12. The collision avoidance system of claim 11, wherein said *at least one* pedestrian parameter[s] comprises the presence, position, speed, or direction of the sensed pedestrian.

13. The collision avoidance system of claim 11, [wherein] *further comprising* at least one alarm associated with said roadway [alerts said pedestrians of an approaching vehicle to avoid] *wherein said at least one alarm provides notification of potential vehicle-to-pedestrian* collision.

14. The collision avoidance system of claim 1, further comprising:

a) [a plurality of] *at least one* train trigger sensor[s each] associated with said roadway, each said train trigger sensor capable of sensing at least one parameter of one or more trains; *and* b) [a plurality of alarms associated with said roadway to alert operators of said vehicles of an approaching train to avoid collision; and]

c) said controller programmed to determine [the] *an increased* likelihood of a collision between said train and [any of said vehicles, and to select and activate said alarm] *the at least one vehicle* and to [select and] activate said [selected] *at least one* vehicle restrictor [immediately] in the path of [said selected] *the at least one* vehicle.

15. The collision avoidance system of claim 14, wherein said *at least one* train parameter[s] comprises the presence, position, speed, or direction of the sensed train.

16. A method for collision avoidance[,] *for use involving at least one vehicle,* comprising *the steps of*:

a) sensing *at least one* parameter[s of a plurality of vehicles];

b) determining [the] *that there is an increased* likelihood of a collision involving [any of said vehicles] *the at least one vehicle* based on said [vehicle] *at least one* parameter[s];

c) determining [which of a selected one or more of said vehicles] *that at least one vehicle* should be slowed or stopped [to avoid said collision] based on said [vehicle] *at least one* parameter[s and local traffic laws];

d) determining at least one [selected] vehicle restrictor[, of a plurality of vehicle restrictors] in a roadway, that is being approached by [said selected] *the at least one* vehicle based on said [vehicle] *at least one* parameter[s] and said vehicle restrictor location[s]; and e) actuating said [selected] vehicle restrictor to control [the parameters of] said [selected] vehicle [to avoid said collision].

17. The collision avoidance method of claim 16, wherein said [vehicle] *at least one* parameter[s] comprise the presence, position, speed, or direction of the [sensed] *at least one* vehicle.

18. The collision avoidance method of claim 16, further comprising *the steps of*:

a) sensing *at least one* parameter[s] of at least one pedestrian;

b) determining [the] *that there is an increased* likelihood of a collision between said *at least one* pedestrian and any of [said] *the at least one* vehicles *based on said at least one parameter*; and

[c) actuating at least one alarm to alert an operator of said vehicle of said approaching vehicle to avoid such a collision.]

*c) actuating at least one vehicle restrictor in a roadway to control said at least one vehicle to be slowed or stopped to reduce the increased likelihood of a collision with at least one pedestrian.*

19. The collision avoidance method of claim 18, wherein said *at least one* pedestrian parameter[s] comprises the presence, position, speed, or direction of the sensed pedestrian.

20. The collision avoidance method of claim 16, further comprising *the steps of*:

a) sensing *at least one* parameter[s] of at least one train;

b) determining [the] *that there is an increased* likelihood of a collision between said *at least one* train and any of [said] *the at least one* vehicles *based on said at least one parameter; and* c) actuating *at least one* vehicle restrictor[s] in a roadway to control [the parameters of said] *the at least one* vehicle to be slowed or stopped to [avoid said] *reduce the increased likelihood of a* collision[; and] *with at least one train.*

[d) actuating at least one alarm to alert an operator of said vehicle of said approaching train to avoid such a collision.]

21. The collision avoidance method of claim 20, wherein said *at least one* train parameter[s] comprises the presence, position, speed, or direction of the sensed train.

*22. The collision avoidance system of claim 1, further comprising a control means to adjust at least one operational parameter, whereby system responses are changed.*

*23. A collision avoidance system for enforcing local traffic laws or rules for use with a traffic control means that is representative of the local traffic laws or rules, capable of displaying a permissive or a non-permissive indicia, said system of collision avoidance, comprising:*

*a) at least one vehicle restrictor associated with a roadway, said at least one vehicle restrictor comprising a member disposed generally transverse to said roadway, capable of being actuated to impede passage thereover of at least one vehicle; and*

*b) a controller that determines an increased likelihood of vehicular collision relative to the status of the traffic control means wherein said controller determines that the at least one vehicle should be slowed or stopped and wherein said at least one vehicle restrictor may be*

*actuated by communication from said controller to impede the passage of the at least one vehicle.*

*24. A method of collision avoidance for enforcing local traffic laws or rules for use with a traffic control means that is representative of the local traffic laws or rules, capable of displaying permissive or non-permissive indicia, said method of collision avoidance comprising the steps of:*

*a) determining the permissive status of the traffic control means that is associated with a roadway;*

*b) determining that at least one vehicle should be slowed or stopped as to reduce the increased likelihood of vehicular collision relative to local traffic laws or rules and status of the traffic control means; and*

*c) impeding movement of the at least one vehicle associated with the roadway by actuating at least one vehicle restrictor when the status of the traffic control means is not permissive.*

*25. A method of collision avoidance, comprising the steps of:*

*a) sensing at least one parameter of at least a first vehicle;*

*b) sensing at least one parameter of at least a second vehicle;*

*c) determining that there is an increased likelihood of a collision involving said at least first vehicle and said at least second vehicle based on said vehicle parameters; and*

*d) determining that at least one vehicle should be slowed or stopped; and*

*e) actuating at least one vehicle restrictor to impede the movement of at least one of said vehicles.*

*26. A method of collision avoidance, comprising the steps of:*

*a) sensing at least one parameter of at least one vehicle;*

*b) sensing at least one parameter of at least one pedestrian or at least one train;*

*c) determining that there is an increased likelihood of a collision involving said at least one vehicle with said at least one pedestrian or said at least one train based on said at least one vehicle parameter and said at least one pedestrian or train parameter;*

*d) determining that at least one vehicle should be slowed or stopped; and*

*e) actuating at least one vehicle restrictor to impede the movement of at least one of said vehicles.*

*27. The collision avoidance system of claim 1, wherein said parameter is associated with one or more vehicles.*

*28. The collision avoidance system of claim 1, wherein said parameter is associated with said traffic control means.*

*29. The collision avoidance system of claim 28, wherein said traffic control means is selected from the group comprising traffic light, caution indicator, school bus indicator, bi-directional light, alphanumeric display, pedestrian crosswalk indicator, train signal, traffic sign, traffic gate, traffic barrier, traffic director, traffic timer or combinations thereof.*

*30. The method for collision avoidance of claim 16, wherein said parameter is associated with one or more vehicles.*

*31. The method for collision avoidance of claim 16, wherein said parameter is associated with a traffic control means.*

*32. The method for collision avoidance of claim 31, wherein said traffic control means is selected from the group comprising traffic light, caution indicator, school bus indicator, bi-directional light, alphanumeric display, pedestrian crosswalk indicator, train signal, traffic sign, traffic gate, traffic barrier, traffic director, traffic timer or combinations thereof.*

* * * * *